US009984321B2

(12) United States Patent
Rampetzreiter et al.

(10) Patent No.: US 9,984,321 B2
(45) Date of Patent: May 29, 2018

(54) CHIP CARD AND CONTROL ELEMENT

(71) Applicant: INFINEON TECHNOLOGIES AG, Neubiberg (DE)

(72) Inventors: Stephan Rampetzreiter, Graz (AT); Martin Buchsbaum, Graz (AT); Jakob Jongsma, Graz (AT); Georg Skacel, Graz (AT); Bernhard Wedl, Graz (AT); Andreas Woerle, Graz (AT)

(73) Assignee: INFINEON TECHNOLOGIES AG, Neubiberg (DE)

(*) Notice: Subject to any disclaimer, the term of this patent is extended or adjusted under 35 U.S.C. 154(b) by 0 days. days.

(21) Appl. No.: 14/973,802

(22) Filed: Dec. 18, 2015

(65) Prior Publication Data
US 2016/0189024 A1 Jun. 30, 2016

(30) Foreign Application Priority Data
Dec. 29, 2014 (DE) .................. 10 2014 119 663

(51) Int. Cl.
*G06K 19/07* (2006.01)
*G06K 19/077* (2006.01)

(52) U.S. Cl.
CPC ..... *G06K 19/0726* (2013.01); *G06K 19/0723* (2013.01); *G06K 19/07794* (2013.01)

(58) Field of Classification Search
CPC ......... G06K 19/07794; G06K 19/0723; G06K 19/0726
See application file for complete search history.

(56) References Cited

U.S. PATENT DOCUMENTS

| 5,724,030 A * | 3/1998 | Urbas ............... A01K 11/006 340/10.34 |
| 6,321,067 B1 | 11/2001 | Suga et al. |
| 2013/0146671 A1* | 6/2013 | Grieshofer ....... G06K 19/07794 235/492 |
| 2014/0042230 A1* | 2/2014 | Pueschner .............. H01Q 1/38 235/492 |
| 2014/0084070 A1* | 3/2014 | Pueschner .......... G06K 7/10178 235/492 |

FOREIGN PATENT DOCUMENTS

| CN | 178407 A | 4/1998 |
| CN | 203217613 U | 9/2013 |

(Continued)

OTHER PUBLICATIONS

Rampetzreiter, "Dual-Interface(DIF) Chip Cards", Speaking SPEed Application Knowledge shariNG, Infineon Technologies AG,8 pages, Mar. 31, 2014.

(Continued)

*Primary Examiner* — Suezu Ellis
(74) *Attorney, Agent, or Firm* — Viering, Jentschura & Partner MBB

(57) ABSTRACT

According to one embodiment, a chip card is described including a chip, an antenna, a coupling structure configured to transmit energy from the antenna to the chip and a control element configured to control, depending on a field strength of a magnetic field to which the chip card is exposed, at least one of the resonance frequency of the antenna, the quality factor of the antenna and an energy transmission efficiency of the coupling structure.

20 Claims, 23 Drawing Sheets

(56) References Cited

FOREIGN PATENT DOCUMENTS

| JP | 2001010264 A | * | 1/2001 | ......... G06K 19/0726 |
|----|--------------|---|--------|------------------------|
| JP | 2001160122 A |   | 6/2001 |                        |
| JP | 2001357369 A | * | 12/2001|                        |
| JP | 2006340085 A |   | 12/2006|                        |
| JP | 2011227668 A |   | 11/2011|                        |

OTHER PUBLICATIONS

"Coil on Module (CoM) the revolution for Dual Interface card production", Infineon Technologies AG, http://www.infineon.com/cms/en/applications/chip-card-security/coil-on-module/?ic=0401002, Apr. 2013, (retrieved Dec. 17, 2014).

"Ab-Initio Calculations of Magnetic Properties of Surfaces, Interfaces and Multilayers",TMR Research Networks Summary Report, http://www.psi-k.org/TMR1/summary_report.htm (retrieved Dec. 17, 2014).

"Permeability (electromagnetism)",Wikipedia Article, http://en.wikipedia.org/wiki/Permeability_(electromagnetism) (retrieved Dec. 17, 2014).

"Ferrite Material for Energy-Meter Current Transformer—T36",PowerGuru Article,http://www.powerguru.org/ferrite-material-for-energy-meter-current-transformer-t36/, Jul. 1, 2006.

"Electronic Components", Radio Training Centre, Deutsche Welle Article, 38 pages (retrieved Dec. 17, 2014).

* cited by examiner

US 9,984,321 B2

CHIP CARD AND CONTROL ELEMENT

CROSS-REFERENCE TO RELATED APPLICATION

This application claims priority to German Patent Application Serial No. 10 2014 119 663.5, which was filed Dec. 29, 2014, and is incorporated herein by reference in its entirety.

TECHNICAL FIELD

The present disclosure relates to chip cards.

BACKGROUND

When a chip card is operated wirelessly, i.e. without galvanically being contacted by a reading device, power for operating the chip card is typically supplied to the chip card by an electromagnetic field emitted by a reading device. While it is desirable to supply sufficient power to the chip card's chip to allow its operation, it may occur that too much power is supplied to chip, e.g. due to the fact that the chip card is brought very closely to the reading device, and the chip threatens to overheat.

SUMMARY

According to one embodiment, a chip card is provided. The chip card includes a chip, an antenna, a coupling structure configured to transmit energy from the antenna to the chip and a control element configured to control, depending on a field strength of a magnetic field to which the chip card is exposed, at least one of the resonance frequency of the antenna, the quality factor of the antenna and an energy transmission efficiency of the coupling structure.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Contactless chip cards may be powered by the voltage powering the chip card's chip being induced in an antenna coil on the chip card which is (galvanically) connected to the chip by exposing the antenna coil to an alternating magnetic field generated by a reader device. Thus, the chip's amount of self-heating due to being powered is directly related to the magnetic field strength: The higher the field strength, the higher the induced voltage and therewith the chip's current consumption and thus the higher the self-heating. Typically, if the temperature of the chip of a chip card exceeds a certain limit an integrated temperature sensor deactivates the chip's operation until the temperature has again dropped below the limit.

Figure 1:
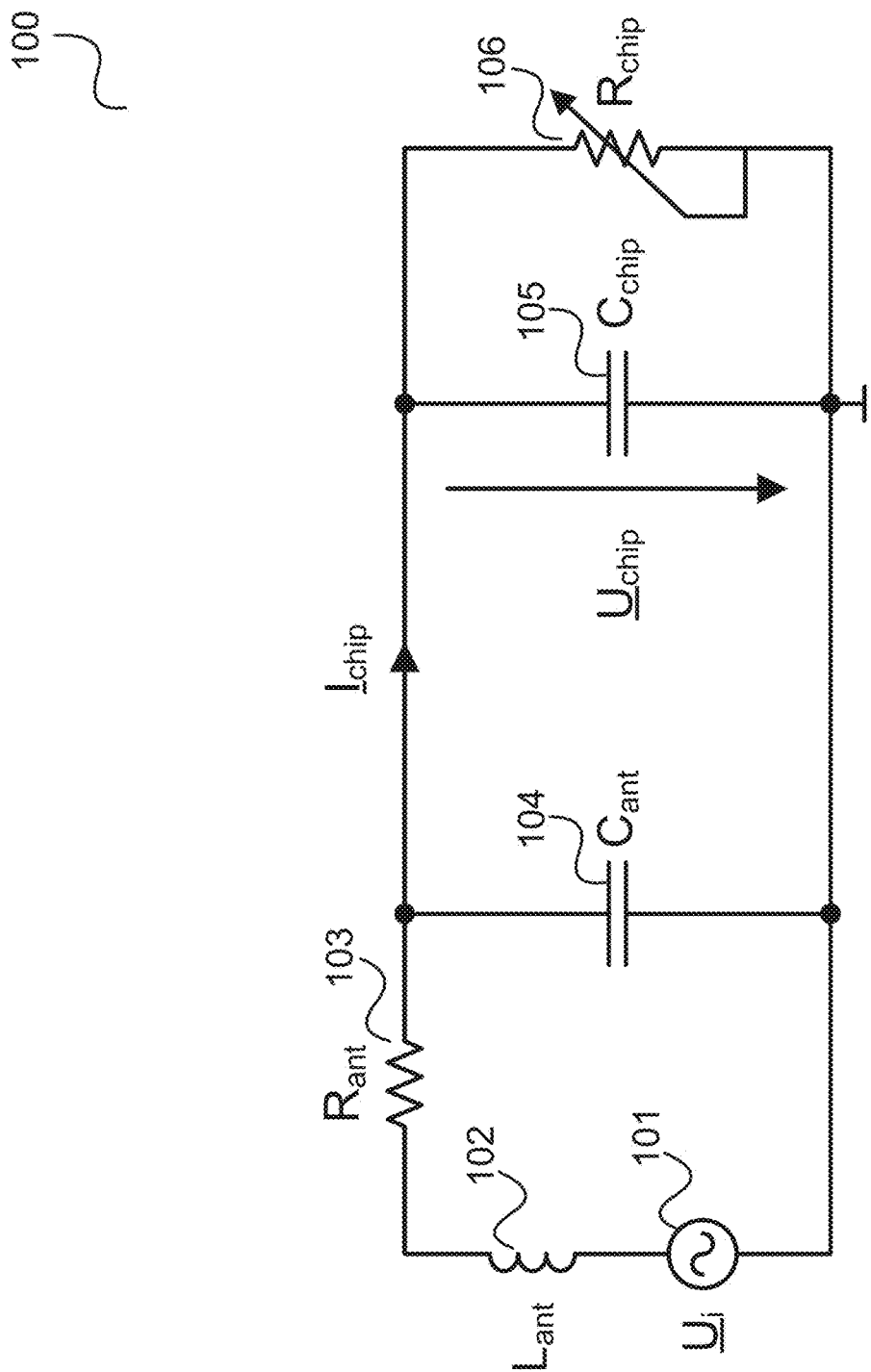
FIG. 1 shows an equivalent circuit for a chip card circuit.

For example, the chip voltage is regulated to a certain value by accordingly adjusting a shunt resistor integrated in the chip as it is illustrated in FIG. 1.

FIG. 1 shows an equivalent circuit for a chip card circuit 100.

The circuit 100 includes an alternating voltage source 101, an inductor 102, a first resistor 103 and a first capacitor 104 connected in parallel and modeling the chip card antenna and the power supplied to the chip card via the chip card antenna. A second capacitor 105 modeling the chip's input capacitance and a second resistor 106 modeling the chip's resistance (depending on the chip's shunt resistor) are connected in parallel to the first capacitor 104.

This value of the chip's shunt resistor directly influences the quality factor of the resonant circuit made up of the chip card antenna and the chip, and therewith also affects the circuit's current appearing as a result of the induced voltage. The higher the available (electro-)magnetic field strength (e.g. provided by a chip card reader) and thus the induced voltage, the more the shunt resistance and therewith the resonant circuit's quality factor is decreased. Accordingly, with increasing magnetic field strength, the resonant circuit's current does not increase as much as the induced voltage does. In other words, the chip itself is able to control the current carried by the antenna coil of the chip card antenna. Therefore, in current chip card systems, where the chip is connected galvanically to the antenna coil exceeding the temperature limit can be considered to not be an issue.

In contrast to a chip card as illustrated in FIG. 1, temperature-related deactivation of the chip may be an issue in case of a chip card utilizing Coil-on-Module Technology, i.e. a chip card which includes a dedicated chip module which is inductively coupled to a so-called booster antenna. The chip module contains the chip and a small, module-sized antenna coil galvanically connected to the chip. The booster antenna circuit is integrated in the chip card body and, basically, consists of two inductors in serial connection. One inductor (referred to as booster antenna) is used for enabling inductive coupling between the chip card and a reader device. Its area typically equals the area of a typical chip card antenna (e.g. the area of the antenna coil of a chip card as illustrated in FIG. 1). The area of the second inductor (referred to as coupling antenna) approximately equals the size of the chip module and is used for establishing magnetic coupling between the booster antenna circuit and the chip module antenna circuit.

Figure 2:
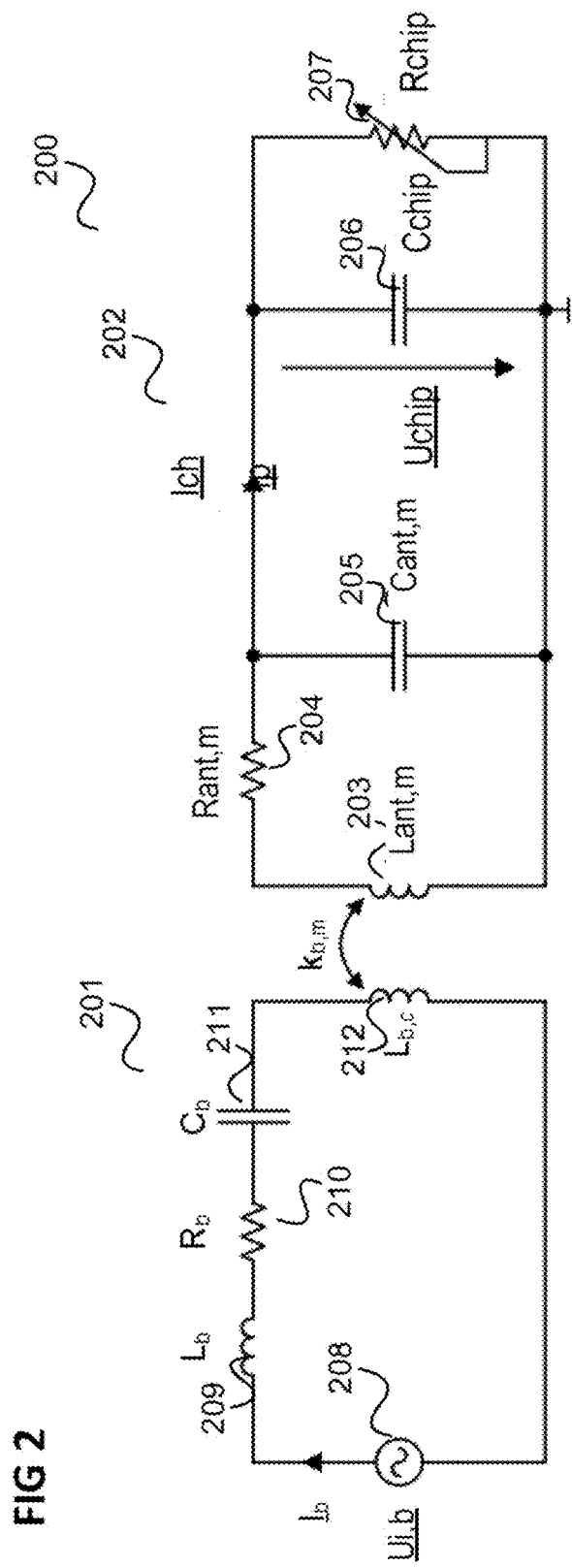
FIG. 2 shows the equivalent circuit of a circuit arrangement for a chip card with booster antenna.

FIG. 2 shows the equivalent circuit of a circuit arrangement 200 for a chip card with a booster antenna.

The circuit arrangement 200 includes a booster antenna circuit 201 and a chip module antenna circuit 202.

The chip module antenna circuit 202, similarly to the circuit 100, includes a first inductor 203, a first resistor 204 and a first capacitor 205 coupled in a circuit and modeling the chip module antenna. A second capacitor 206 modeling the chip's capacity and a second resistor 207 modeling the chip's resistance are connected in parallel to the first capacitor 205.

The booster antenna circuit 201 includes an alternating voltage source 208, a second inductor 209, a third resistor 210, a third capacitor 211 and a third inductor 212 connected in series. The second inductor 209 models the inductance of the booster antenna and the alternating power supply 208 models the voltage induced in the booster antenna. The third inductor models the inductance utilized for coupling the booster antenna circuit 201 with the chip module antenna circuit 202, i.e. the coupling antenna. The resistive and capacitive components of the booster antenna circuit 201 are combined into the third resistor 210 and the third capacitor 211.

As can be seen, in case of the inductively coupled chip card system as illustrated in FIG. 2 the chip can influence the quality factor of the resonant circuit made up of module antenna and chip but the booster antenna's quality factor and resonance frequency remains (substantially) constant. Consequently, with increasing magnetic field strength the voltage induced in the booster antenna and thus its current can increase unlimitedly. In contrast to galvanically coupled chip card systems as illustrated in FIG. 1, decreasing just the module resonant circuit's quality factor typically does not limit the power applied to the chip sufficiently. This leads to temperature-related deactivation of the chip at field strength values much lower than in case of galvanically coupled systems.

Restrictions may result from this issue relating to the following areas:

Antenna design;
Standard compliancy (such as ISO/IEC 14443, EMVCo, . . . );
System robustness;
System lifetime;
Minimum operating field strength.

In the following, embodiments are described which allow limiting the power transferred from a reader device to a chip card module via a booster antenna in an inductively coupled chip card having a booster antenna as described with reference to FIG. 2 (such as a Coil-on-Module chip card) and thus allow limiting self-heating of such a chip card's chip.

Figure 3:
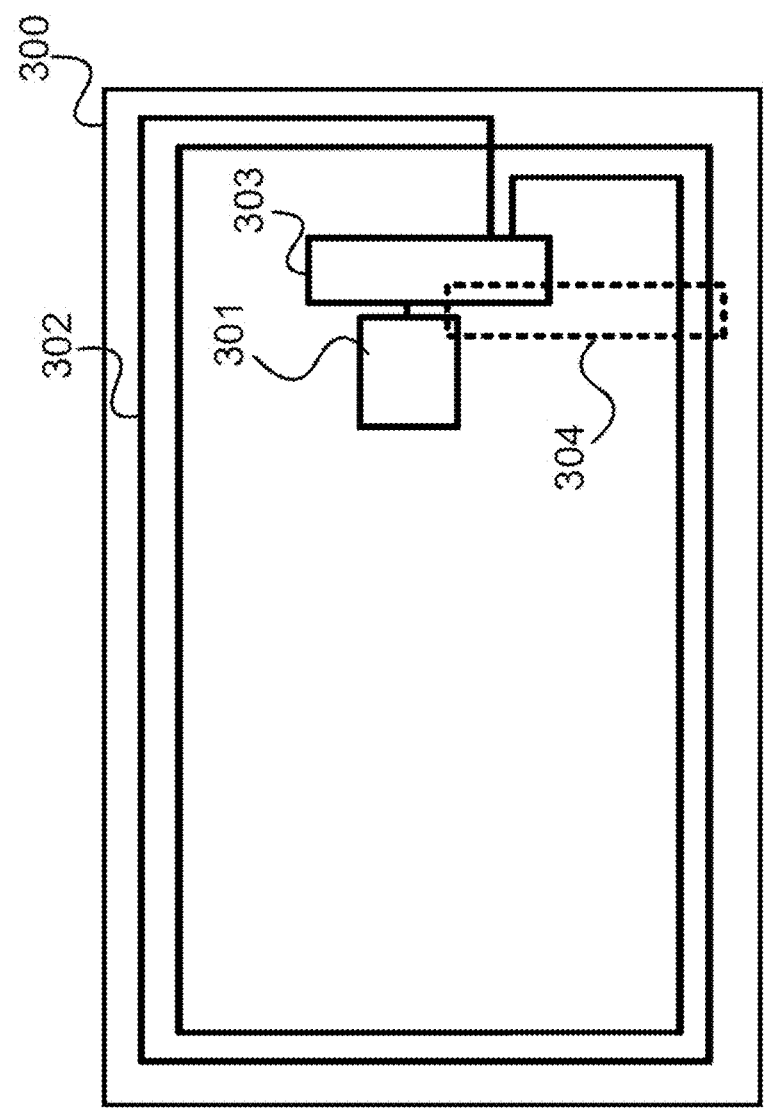
FIG. 3 shows a chip card according to an embodiment.

FIG. 3 shows a chip card 300 according to an embodiment.

The chip card 300 includes a chip 301, an antenna 302 and a coupling structure 303 configured to transmit energy from the antenna 302 to the chip 301.

The chip card 300 further includes a control element 304 (also referred to as a "circuit component") configured to control, depending on a field strength of a magnetic field to which the chip card is exposed, at least one of the resonance frequency of the antenna, the quality factor of the antenna and an energy transmission efficiency of the coupling structure.

According to one embodiment, in other words, the resonance frequency and/or the quality factor of an antenna and/or its coupling to the chip (e.g. in a system as described with reference to FIG. 2) is dynamically adapted to the magnetic field strength which is applied to the chip card (e.g. by a reader, i.e. a reading device), or, in other words, is adapted to the energy supplied to the chip card (which is for example reflected in the chip temperature). This allows a dynamic adaptation/limitation of the power consumption of the chip card module in relation to the available magnetic field strength (in contrast to, for example, a static adjustment of a booster antenna's resonance frequency and quality factor).

It should be noted that "antenna" may be understood to refer to an antenna coil, or in other words a coil-shaped antenna.

It should further be noted that the control element 304 may control exactly one of or a plurality of the resonance frequency of the antenna, the quality factor of the antenna and an energy transmission efficiency of the coupling structure depending on the field strength of a magnetic field to which the chip card is exposed.

For example, this allows in case of a Coil-on-Module dual-interface chip card, i.e. a chip card having a contactless and a contact-based interface, to avoid losses with regard to standard specifications (ISO/IEC 14443, EMVCo).

Further, in case of a contactless-only chip card manufactured in Coil-on-Module technology, having no contact-based interface and a module completely embedded in the card body, compliancy to relevant standards can be achieved.

The antenna is for example galvanically coupled to the chip by the coupling structure. In other words, the coupling structure is for example a galvanical connection.

The control element is for example configured to shift the resonance frequency of the antenna away from a predetermined system frequency with increasing field strength of the magnetic field above a threshold of the field strength of the magnetic field.

The control element may also be configured to reduce the quality factor of the antenna with increasing field strength of the magnetic field above a threshold of the field strength of the magnetic field.

According to one embodiment, the antenna is a booster antenna, the chip card includes a chip module antenna circuit including the chip and a chip module antenna, the chip card includes a booster antenna circuit including the booster antenna and a coupling antenna inductively coupled to the chip module antenna, e.g. inductively coupled to the chip module antenna, the booster antenna circuit forms a resonant circuit and the control element is configured to control at least one of the resonance frequency of the booster antenna circuit, the quality factor of the booster antenna circuit and an inductive coupling between the booster antenna circuit and the chip module antenna circuit depending on a field strength of a magnetic field to which the chip card is exposed. In other words, according to one embodiment, the coupling structure includes a chip module antenna inductively coupled with a coupling antenna of a booster antenna circuit. In this case, the energy transmission efficiency of the coupling structure may be seen as the efficiency of the inductive coupling (e.g. the mutual inductance) between the chip module antenna and the coupling antenna.

According to one embodiment the control element is configured to control the mutual inductance of the coupling antenna and the chip module antenna depending on the field strength of the magnetic field.

For example, the control element is configured to decrease the mutual inductance of the coupling antenna and the chip module antenna with increasing field strength of the magnetic field above a threshold of the field strength of the magnetic field.

In other words, the control element may decrease the resonance frequency and/or the quality factor of the booster antenna circuit and/or the mutual inductance of the coupling antenna and the chip module antenna when the magnetic field strength increases when it has reached a certain range, i.e. exceeded a certain threshold.

The control element is for example a variable resistor (e.g. arranged in the booster antenna circuit).

For example, the variable resistor is a resistor whose resistance depends on the field strength of a magnetic field to which it is exposed.

The variable resistor may for example include a structure showing a giant magnetoresistance effect.

According to one embodiment, the variable resistor is arranged in physical contact to the chip to be heated by the chip.

The control element may also be a voltage limiting element (e.g. arranged in the booster antenna circuit or the chip module antenna circuit).

For example, the control element is a voltage limiting element arranged to shorten at least a part of the coupling antenna or the chip module antenna.

The voltage limiting element is for example an element with a non-linear voltage-dependent resistance.

For example, the voltage limiting element includes a diode or a varistor.

According to one embodiment, the control element is a ferrite core of the coupling antenna.

According to one embodiment, the booster antenna circuit further includes a sense antenna and the control element is a ferrite core of the sense antenna.

In the following, embodiments are described in more detail with reference to a chip card having the architecture illustrated in FIG. 2 and FIG. 3.

According to various embodiments, in order to prevent that the chip card's chip disables its contactless functionality by an internal temperature sensor due to too much self-heating, it is tried to limit the power applied to the chip by introducing a dynamic power-limitation (control) element, either directly integrated in the booster antenna, the booster antenna inlay or core, or in addition to the chip's shunt resistor, implemented on the chip module. This control element is for example configured to dynamically influence the induced voltage and/or the current in the booster antenna or the chip module resonant circuit, depending on a magnetic field strength (e.g. of the magnetic field provided by a reader) to which the chip card is exposed. The power limitation for example starts working as soon as the magnetic field strength and therewith the voltages induced in the booster antenna and the chip module antenna exceed specific, pre-defined values.

Figure 4:
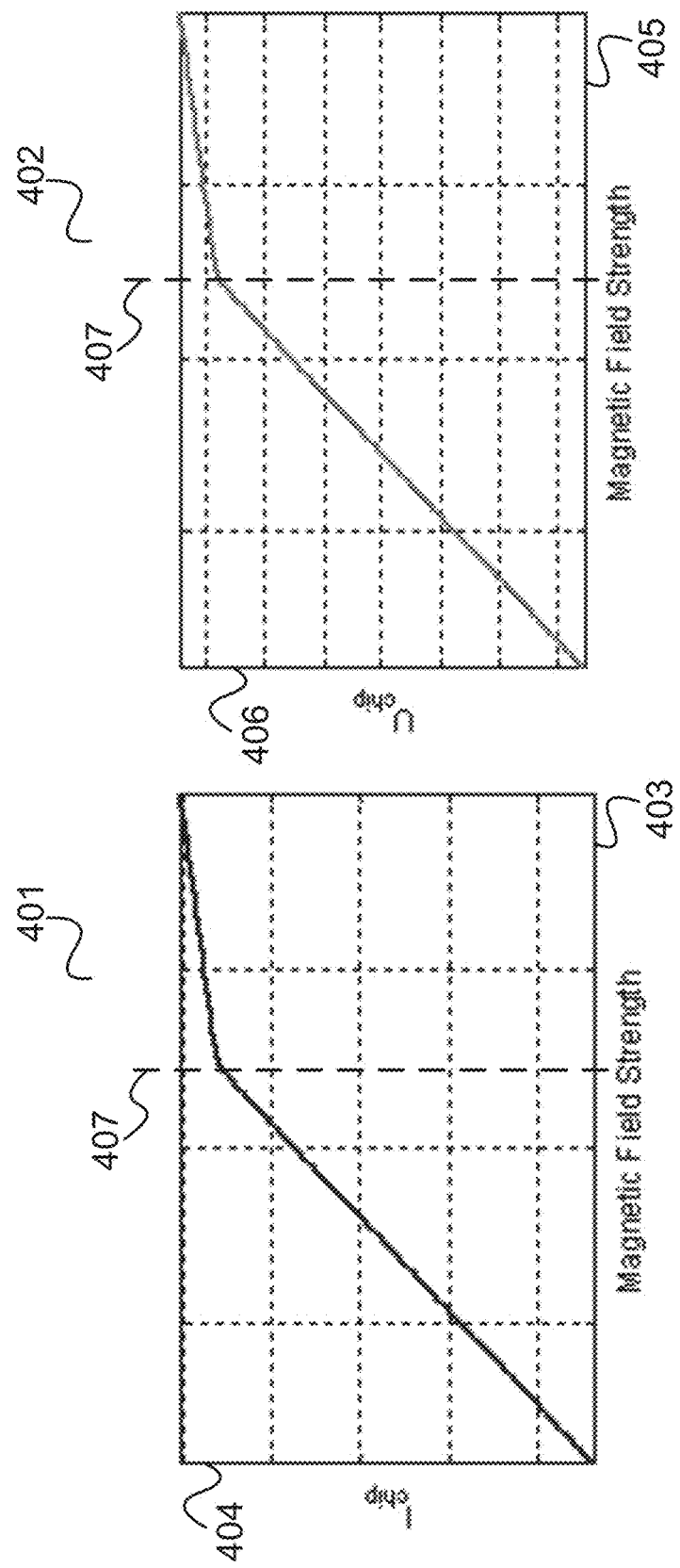
FIG. 4 shows a first diagram qualitatively illustrating the behavior of the chip current in relation to the magnetic field strength and a second diagram illustrating the behavior of the chip voltage in relation to the magnetic field strength.

Schematically, the FIG. 4 shows how the behavior of the power applied to the chip is influenced if such a power-limitation element is used in the chip card system.

FIG. 4 shows a first diagram 401 illustrating the behavior of the chip current in relation to the magnetic field strength and a second diagram 402 illustrating the behavior of the chip voltage in relation to the magnetic field strength.

Magnetic field strength increases from left to right along a respective horizontal axis 403, 405 and the chip current $I_{chip}$ (as defined as shown in FIG. 2) and the chip voltage $U_{chip}$ (as defined as shown in FIG. 2) increase from bottom to top along a respective vertical axis 404, 406.

As can be seen, in this example, at a certain magnetic field strength 407 the effect of the control element kicks in and the increase of the chip current and the chip voltage with magnetic field strength is decreased, i.e. the gradients of the graphs shown in the diagrams 401, 402 is decreased. According to various embodiments, the control element introduces a field-strength-dependent limitation of voltage and/or current, for example as illustrated in the first diagram 401 (current limitation) and the second diagram 402 (voltage limitation). Since both the booster antenna circuit and the chip module antenna in combination with the chip (i.e. the chip module antenna circuit) represent resonant circuits, the realization of such a limitation may be achieved based on a dynamic damping of the resonant circuits' currents and/or shifting their resonance frequencies.

In the following, examples for implementing a control element as described above are given.

a) Adjustable/Adjusted Resistor as Control Element

Depending on how an adjustable/adjusted resistor is integrated as control element it may change the resonance frequency or the quality factor of the booster antenna circuit.

Realizing adjustable resistors can be done by using specific material structures which adapt their resistance in accordance to the magnetic field and the current, respectively. Such material structures could either be implemented as stand-alone element connected to the booster antenna coil (i.e. in the form of an SMD (Service Mounted Device)-like device), as element integrated in the booster antenna inlay or as specifically structured material used as substrate for the booster antenna inlay or the chip module.

Figure 5:
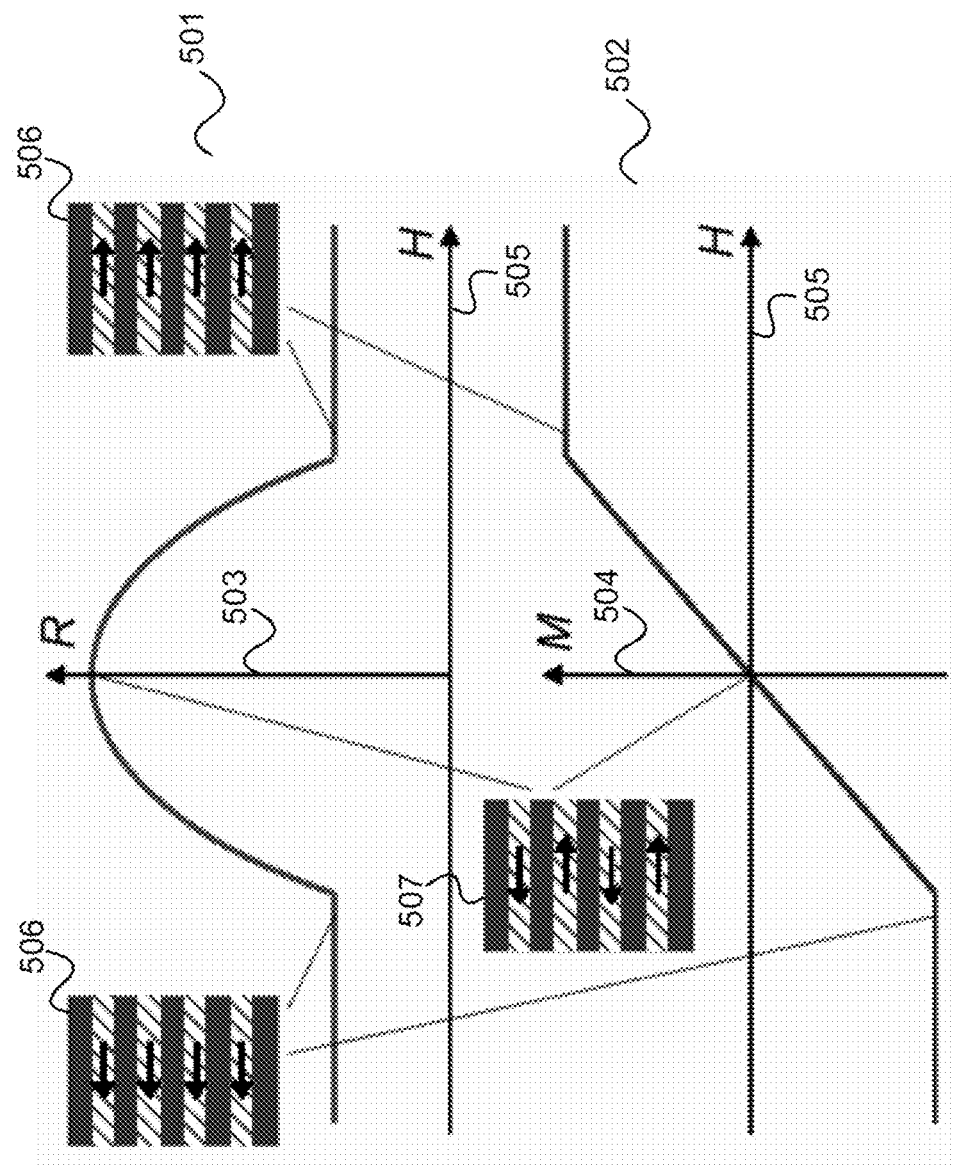
FIG. 5 illustrates the giant magnetoresistance effect.

For instance, such a control element could be made up of structures utilizing the giant magnetoresistance effect as it is illustrated in FIG. 5.

FIG. 5 illustrates the giant magnetoresistance (GMR) effect.

A first diagram 501 illustrates the resistance (increasing from bottom to top along a first vertical axis 503) of a structure showing the giant magnetoresistance effect and the second diagram 502 illustrates the magnetization of the structure (increasing from bottom to top along a second vertical axis 504) in dependence of magnetic field strength increasing from left to right along respective (corresponding) horizontal axes 505.

The structure for example includes artificially grown magnetic multilayers, the main ingredient being two magnetic layers (such as Co) separated by a non-magnetic spacer layer (such as Cu), in this case a Co/Cu/Co sandwich. The GMR effect can be seen to utilize the fact that the resistance is different depending on whether the magnetic moments of the two magnetic layers are parallel (as illustrated by blocks 506 illustrating the state for a magnetic field strength where the resistance is low) or anti-parallel (as illustrated by block 507 illustrating the state for a magnetic field strength where the resistance is high).

Also the temperature dependency of the resistance value of a material can be utilized for implementing a control element as described above. In this case, the chip's temperature can be used for heating up the antenna's conductor, a thermistor or bimetal element.

Figure 6:
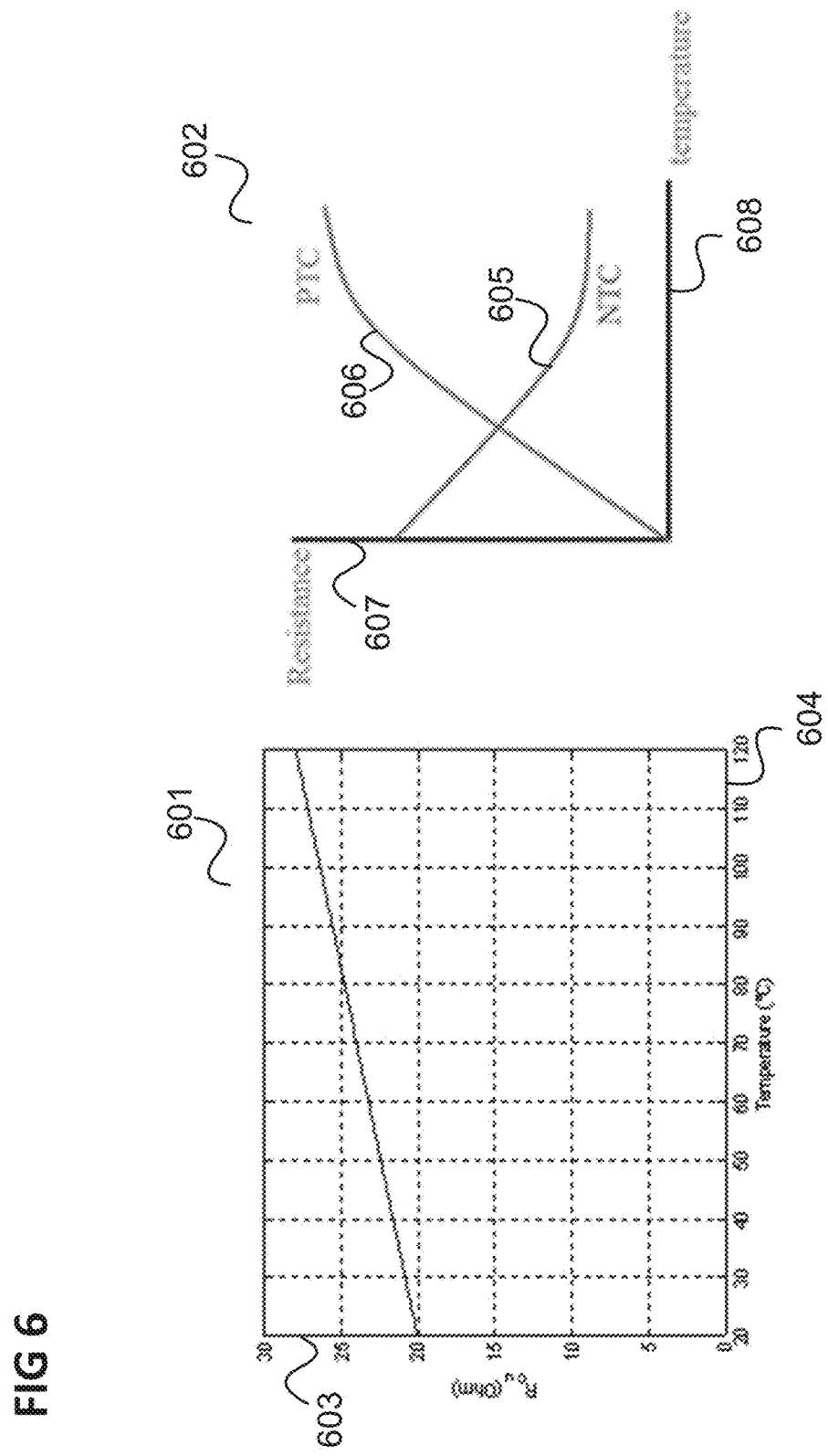
FIG. 6 illustrates a temperature-dependent resistive behavior of a material.

FIG. 6 illustrates a temperature-dependent resistance behavior of a material.

A first diagram 601 shows the resistance of copper (increasing from bottom to top along a first vertical axis 603) as it increases with temperature (increasing from left to right along a first horizontal axis 604).

A second diagram 602 shows a first graph 605 illustrating the behavior of resistance (increasing from bottom to top along a second vertical axis 607) in dependence of temperature (increasing from left to right along a second horizontal axis 608) of a material with negative temperature coefficient and a second graph 606 illustrating the behavior of resistance in dependence of temperature of a material with positive temperature coefficient.

Figure 7:
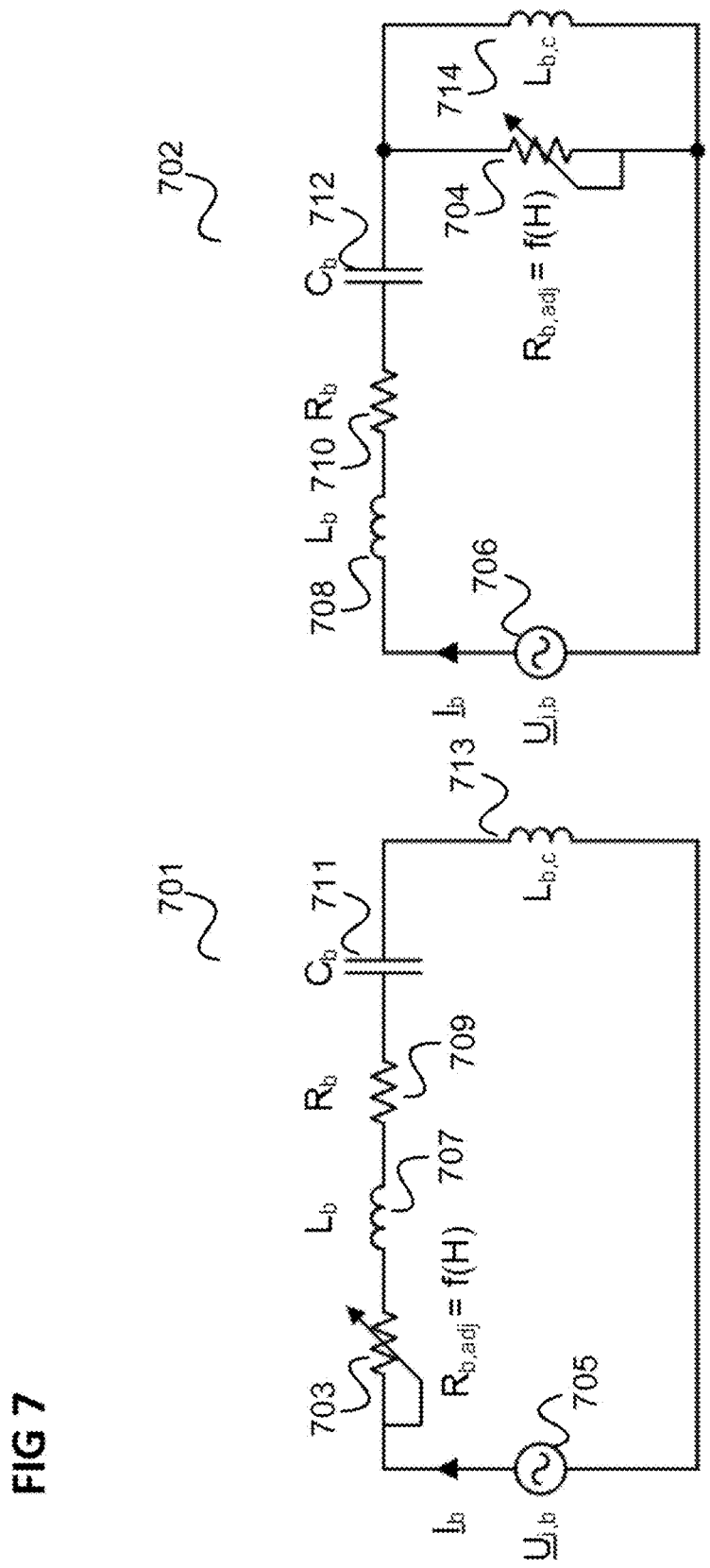
FIG. 7 shows a first booster antenna circuit having a control element for changing the quality factor of the circuit and a second booster antenna circuit having a control element for changing the resonance frequency of the circuit.

FIG. 7 shows a first booster antenna circuit 701 having a control element 703 for changing the quality factor of the circuit and a second booster antenna circuit 702 having a control element 704 for changing the resonance frequency of the circuit.

Both circuits 701, 702 correspond to the booster antenna circuit 201 and accordingly have an alternating voltage source 705, 706, a first inductor 707, 708, a resistor 709, 710, a capacitor 711, 712 and a second inductor 713, 714.

In contrast to the booster antenna circuit 201, the first booster antenna circuit 701 includes a control element 703 in the form of a magnetic-field dependent resistor arranged between the alternating voltage source 705 and the first inductor 707 which changes the quality factor of the first booster antenna circuit 201 depending on the magnetic field strength to which it is exposed.

The second booster antenna circuit 702, in contrast to the booster antenna circuit 201, includes a control element 704 in the form of a magnetic-field dependent resistor arranged in parallel to the second inductor 714 which changes the resonance frequency of the second booster antenna circuit 201 depending on the magnetic field strength to which it is exposed. Additionally, the current through the second inductor 714 is decreased by bypassing it through the control element. Consequently, the voltage induced in the chip module antenna and thus the power transferred to it is also decreased.

As mentioned above, a control element for dynamically changing the resonance frequency, the quality factor or also dynamically damping the current of the booster antenna circuit may not only be implemented by a magnetic-field dependent resistor as illustrated in FIG. 7 but also by a temperature-dependent resistor.

Figure 8:
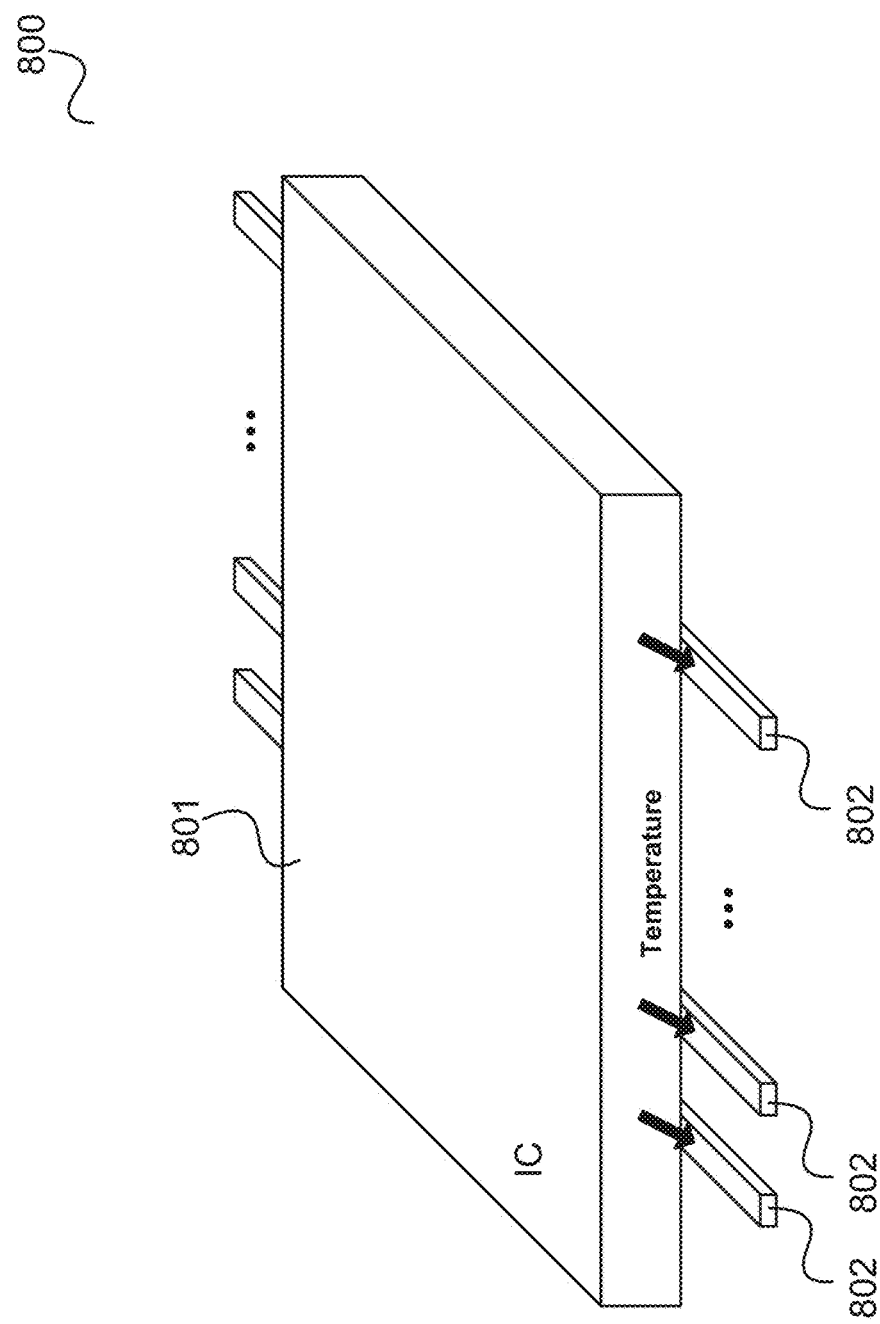
FIG. 8 shows an arrangement where the chip of a chip card is arranged on sections of booster antenna conductors such that the chip acts as a heating source for the booster antenna conductor sections.

FIG. 8 shows an arrangement 800 where the chip 801 of a chip card is arranged on sections of booster antenna conductors 802 such that the chip acts as a heating source for the booster antenna conductor sections 802. For example, parallel sections of each of a plurality of coils (as illustrated in FIG. 2) are arranged beneath the chip and these sections are formed of a material with temperature-dependent behavior such that for example, the quality factor of the booster antenna changes in dependence of the chip temperature, similarly to the first booster antenna circuit 701.

Figure 9:
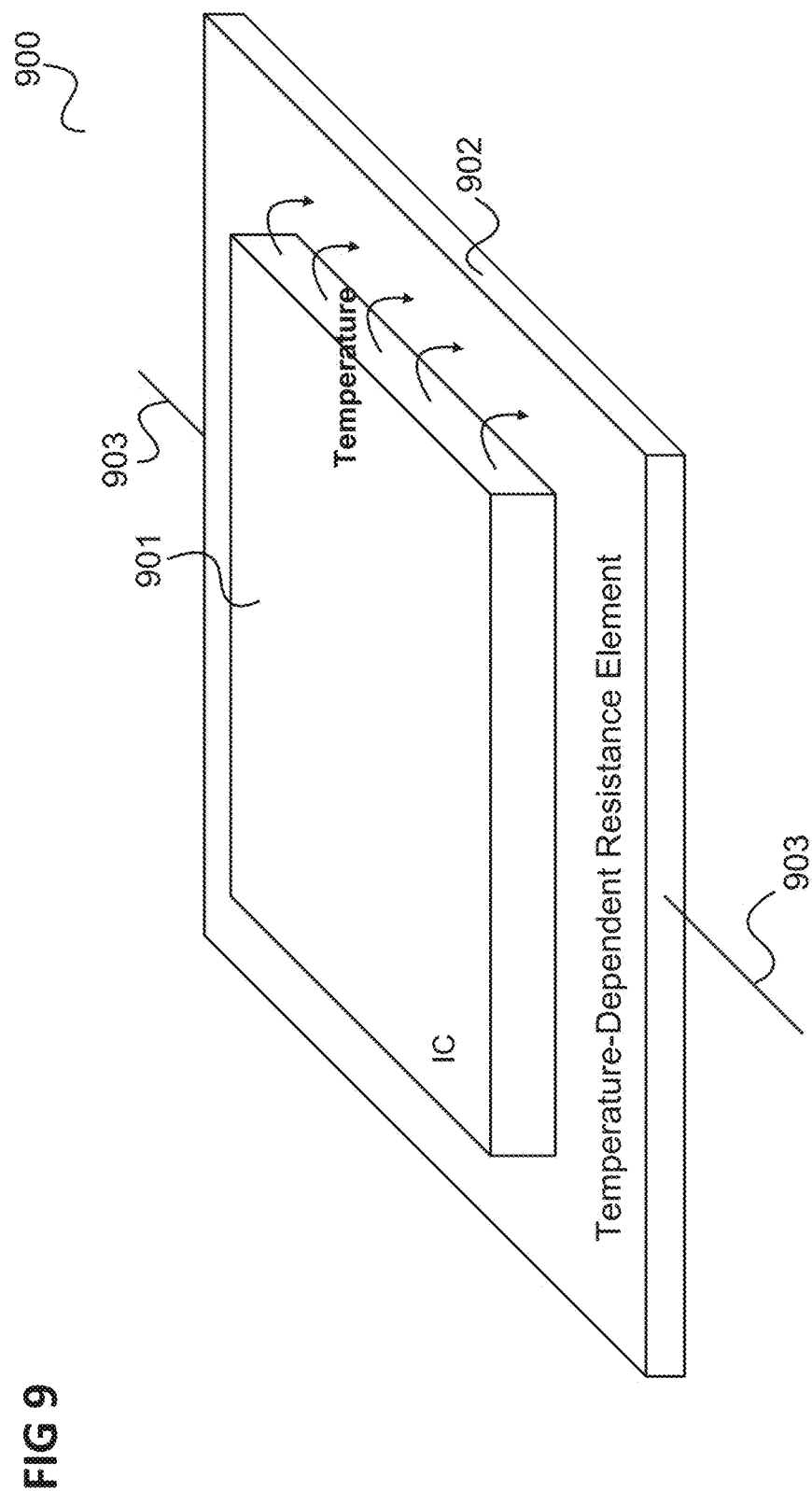
FIG. 9 shows an arrangement where the chip of a chip card is arranged on a temperature-dependent resistance element such that the chip acts as a heating source for the temperature-dependent resistance element.

FIG. 9 shows an arrangement 900 where the chip 901 of a chip card is arranged on a temperature-dependent resistance element 902 such that the chip acts as a heating source for the temperature-dependent resistance element 902. The temperature-dependent resistance element 902 may be connected into the booster antenna circuit via connections 903 for example serially as in case of the first booster antenna circuit 701 or in parallel to, for example, the second inductor 714 as in case of the second booster antenna circuit 702.

b) Voltage-Limiting Element as Control Element

Furthermore, a voltage-limiting element can be used as control element, e.g. can be used in a booster antenna circuit and/or a chip module antenna circuit to change the resonant frequency and/or the quality factor of the booster antenna circuit resonant circuit or the coupling between the booster antenna circuit and the chip module antenna circuit and/or for damping the current in one of these circuits. This can for example be achieved by current re-direction. If, for example, a booster antenna circuit's coupling coil (i.e. the second inductor 212 in the illustration of FIG. 2) is shorted by such an element the voltage induced in the chip module antenna is decreased. This effect can also be achieved by a corresponding arrangement of the element in the chip module antenna circuit.

Figure 10:
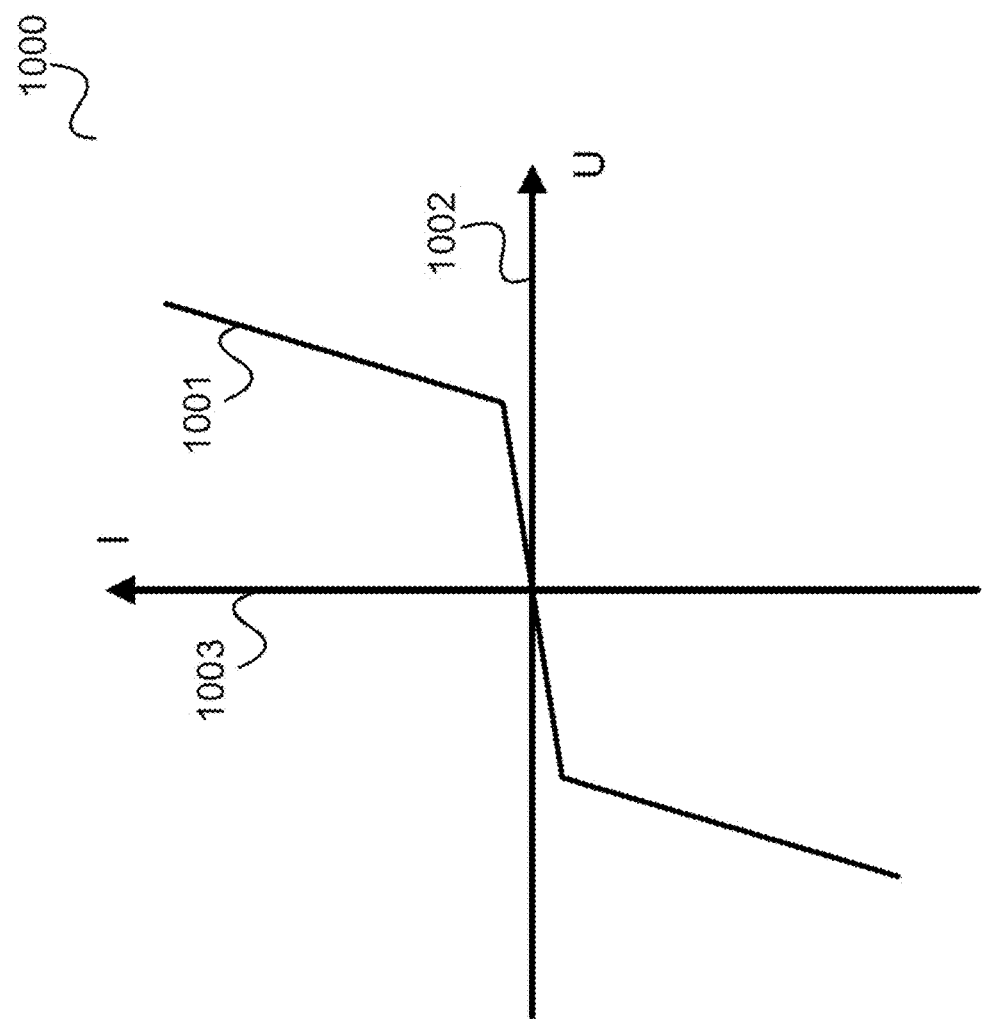
FIG. 10 shows a diagram with a graph illustrating the behavior of a voltage-limiting element.

FIG. 10 shows a diagram 1000 with a graph 1001 illustrating the behavior of a voltage-limiting element.

Voltage increases from left to right along a horizontal axis 1002 and current increases from bottom to top along a vertical axis 1003.

Figure 11:
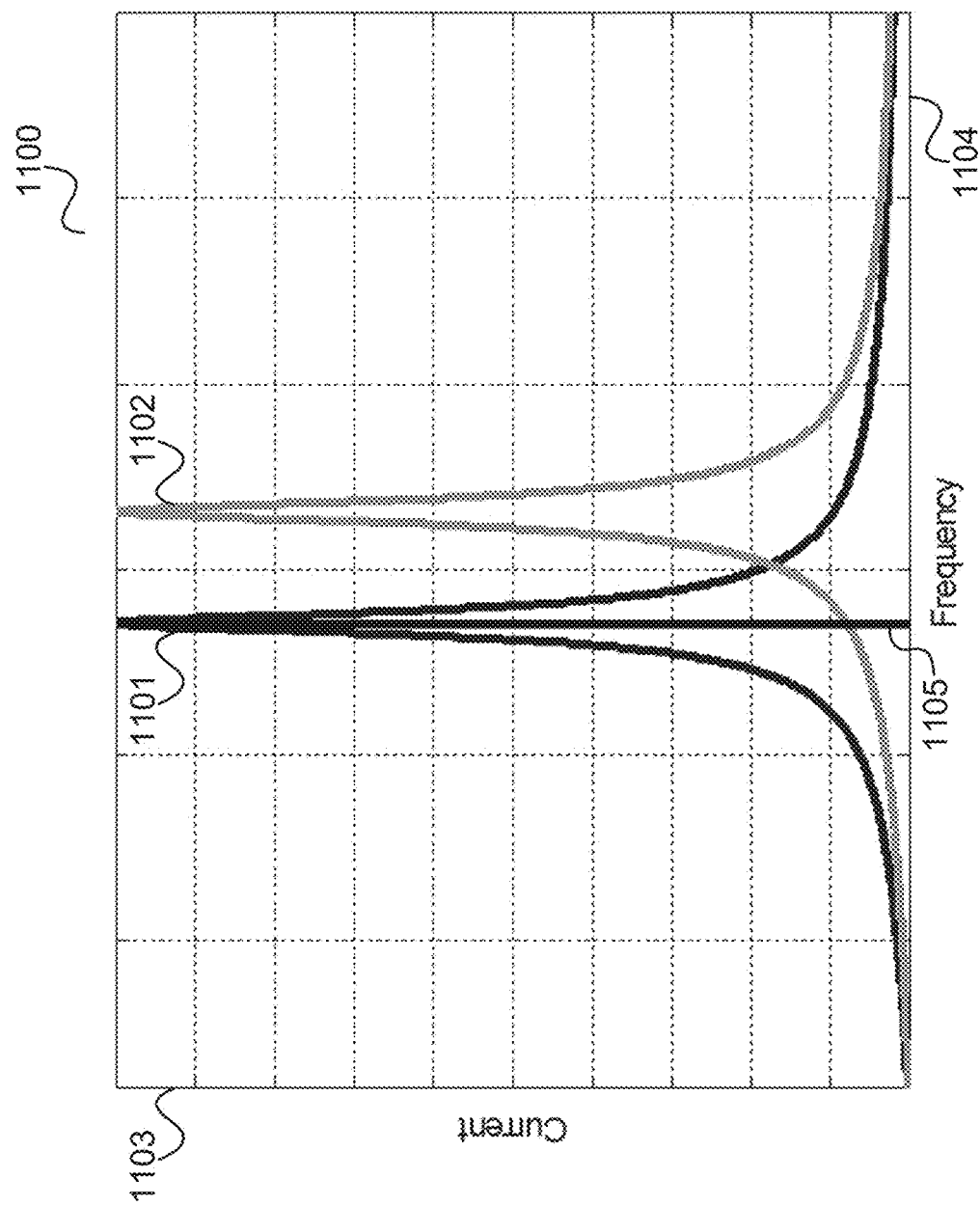
FIG. 11 shows a diagram with a first graph showing the dependence of the booster antenna current on frequency for a first resonance frequency and a second graph showing the dependence of the booster antenna current on frequency for a second resonance frequency.

For example, a voltage-limiting element can be placed as control element to shorten the capacitor of the booster antenna or a part of an inductor of the booster antenna to shift the booster antenna's resonance frequency with respect to the transmission frequency of a reader to reduce the current resulting from the voltage induced into the booster antenna as it is illustrated in FIG. 11.

FIG. 11 shows a diagram 1100 with a first graph 1101 showing the dependence of the booster antenna current (increasing from bottom to top along a vertical axis 1103) on frequency (increasing from left to right along a horizontal axis 1104) for a first resonance frequency and a second graph 1102 showing the dependence of the booster antenna current on frequency for a second resonance frequency.

For example, the first graph 1101 corresponds to the case that the resonance frequency of the booster antenna circuit is tuned to the system frequency 1105, i.e. to the frequency at which a reader transmits power (e.g. 13.56 MHz) leading to a large current being induced in the booster antenna circuit. For example, the control element is configured to shift the resonance frequency when this current gets to high (e.g. in case of increasing magnetic field strength when the magnetic field strength has exceeded a certain threshold) such that the induced current follows the behavior of the second graph 1102 and the induced current is reduced.

As voltage-limiting control element a varistor or one or more diodes (e.g. two anti-parallel connected diodes) may be used. Typically, voltage-limiting elements like diodes or varistors consist of a layered structure whose conductivity depends on the voltage applied. Such a structure could either be integrated in the booster antenna, chip module antenna or the coupling antenna as discrete device, but may also be realized within the structure of the substrate material used for manufacturing the booster antenna inlay and the chip module, respectively.

Figure 12:
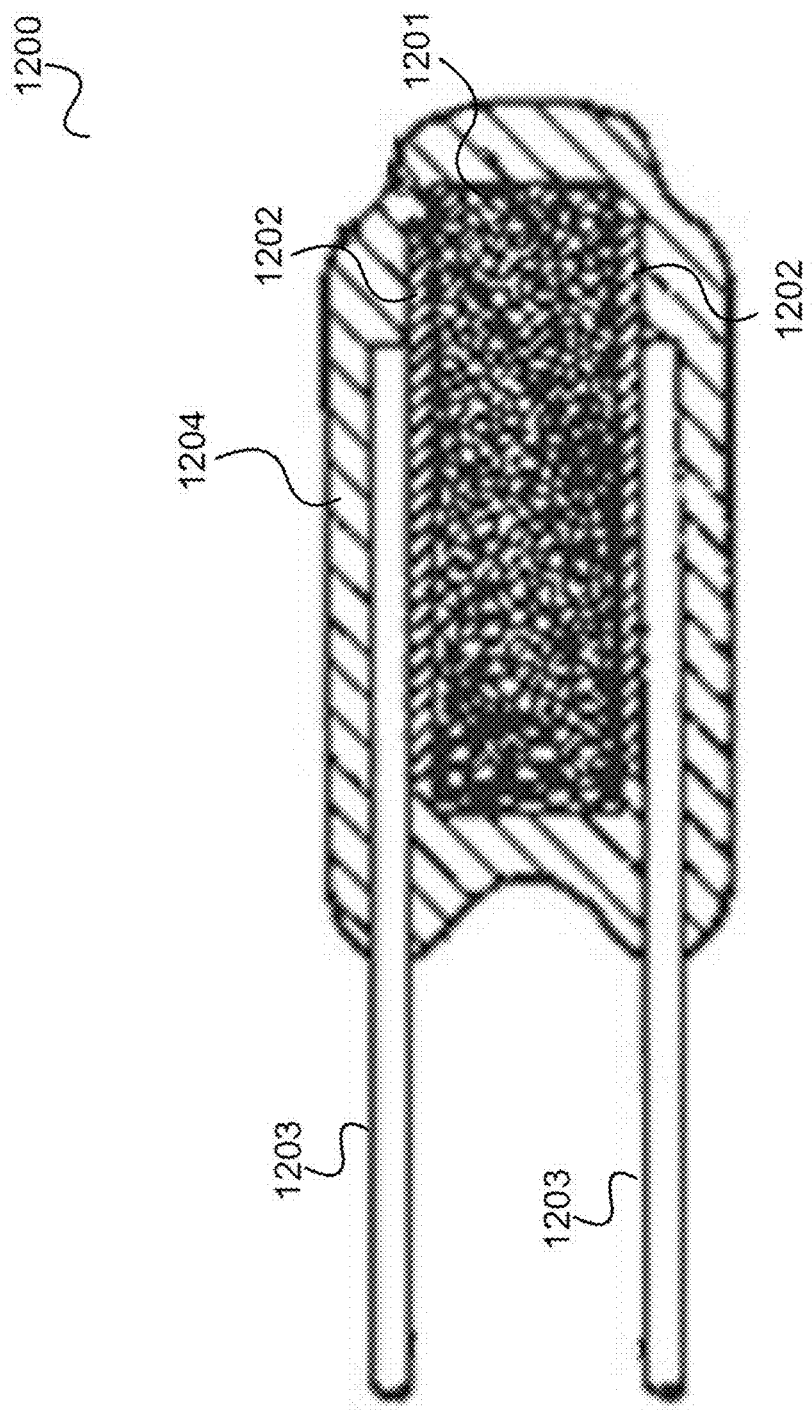
FIG. 12 shows a voltage-dependent resistor.

FIG. 12 shows a voltage-dependent resistor (VDR) 1200.

The voltage-dependent resistor 1200 includes a layer of sintered metal oxide crystals 1201 between two parallel electrodes 1202 contacted with wires that lead out of a coating 1204 which encloses the electrodes and the layer of sintered metal oxide crystals 1201.

Figure 13:
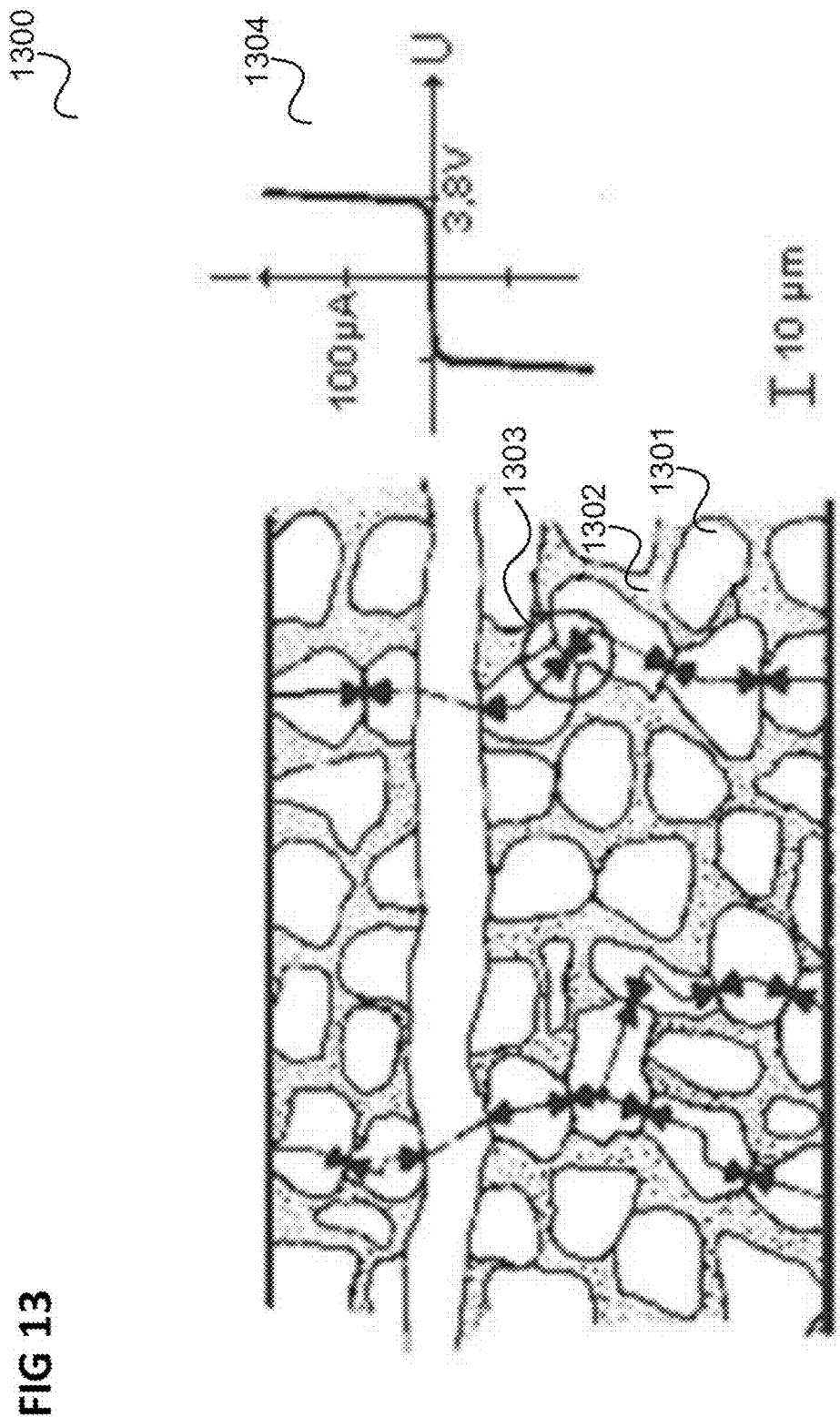
FIG. 13 shows a layer of sintered metal oxide crystals of the resistor of FIG. 12 in more detail.

FIG. 13 shows the layer of sintered metal oxide crystals 1201 in more detail.

The layer of sintered metal oxide crystals includes metal oxide crystals 1301 separated by a cristal separation 1302. The layer 1201 thus forms micro varistors 1303 having a non-linear voltage-dependent resistance as illustrated by the diagram 1304.

In the following, examples of how such a voltage-limiting element could be integrated in the booster antenna circuit or the module resonant circuit are given.

Figure 14:
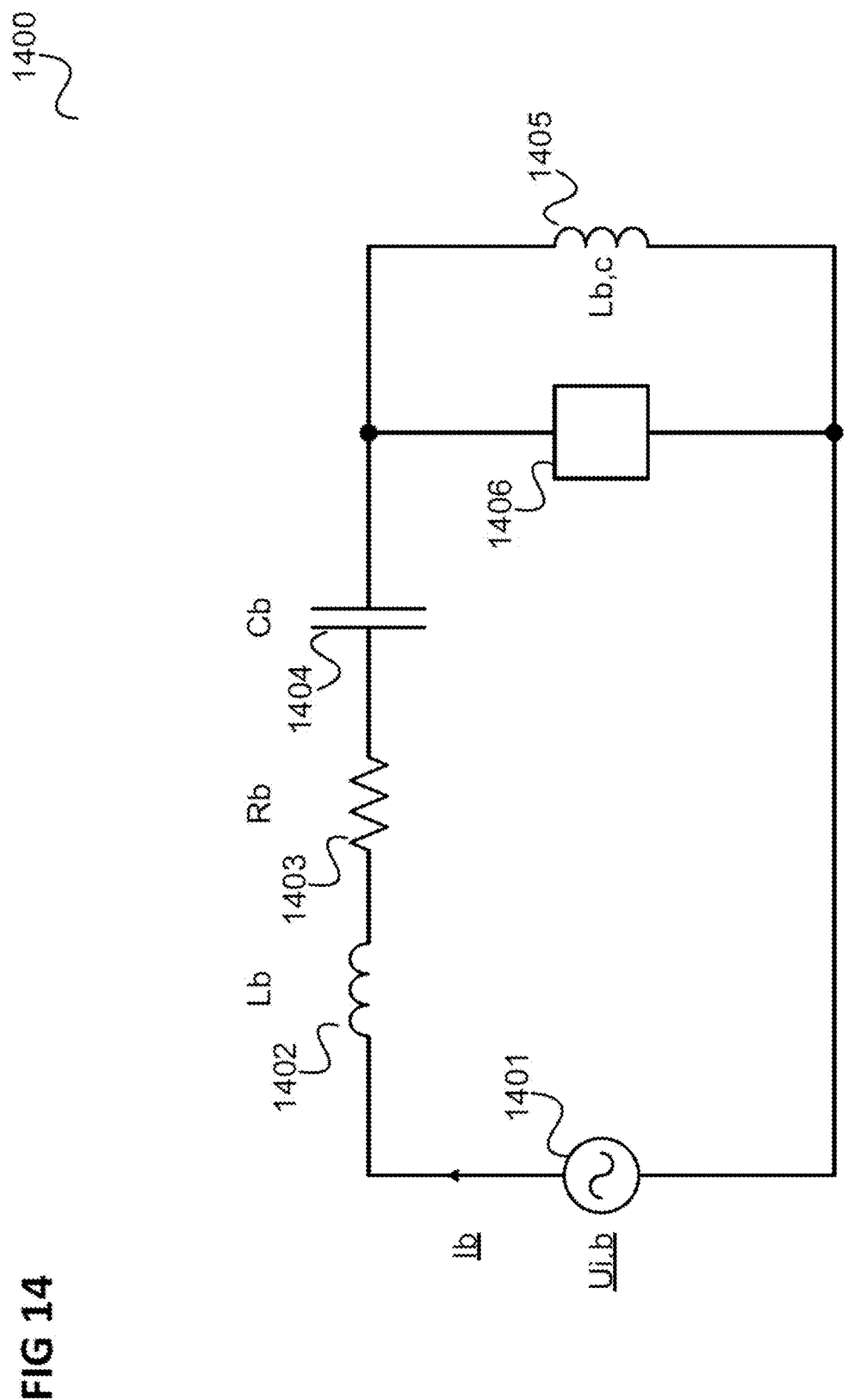
FIG. 14 shows a booster antenna circuit with a voltage-limiting element in parallel to the coupling antenna.

FIG. 14 shows a booster antenna circuit 1400 with a voltage-limiting element in parallel to the coupling antenna.

The booster circuit 1400 corresponds to the booster antenna circuit 201 and accordingly has an alternating voltage source 1401, a first inductor 1402, a resistor 1403, a capacitor 1404 and a second inductor 1405.

In contrast to the booster antenna circuit 201 a voltage-limiting element 1406 is arranged in parallel to the second inductor 1405.

Figure 15:
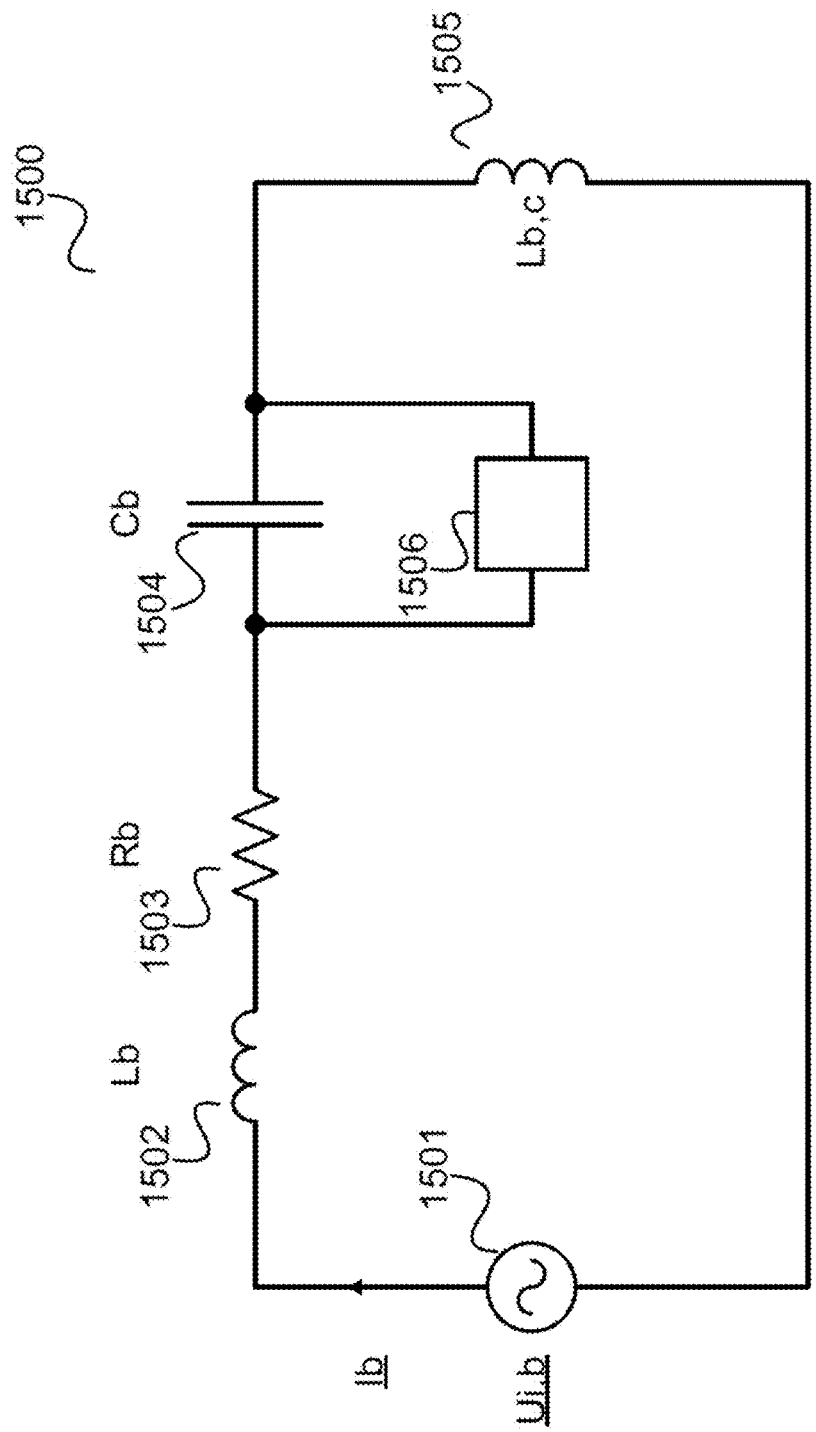
FIG. 15 shows a booster antenna circuit with a voltage-limiting element in parallel to the booster antenna capacitor.

FIG. 15 shows a booster antenna circuit 1500 with a voltage-limiting element in parallel to the booster antenna capacitor.

The booster circuit 1500 corresponds to the booster antenna circuit 201 and accordingly has an alternating voltage source 1501, a first inductor 1502, a resistor 1503, a capacitor 1504 and a second inductor 1505.

In contrast to the booster antenna circuit 201 a voltage-limiting element 1506 is arranged in parallel to the capacitor 1504.

Figure 16:
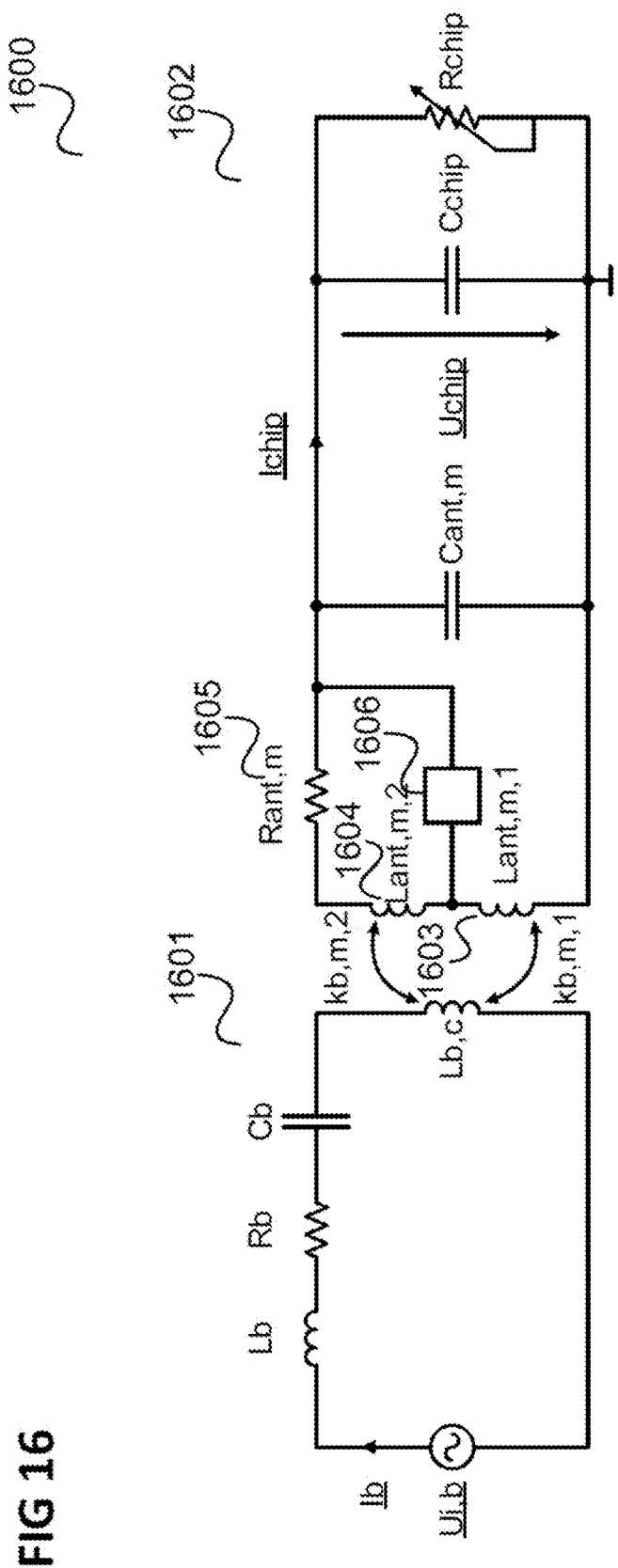
FIG. 16 shows a circuit arrangement with a booster antenna circuit and a chip module antenna circuit, wherein the chip module antenna circuit includes a voltage-limiting element arranged to shorten a part of the chip module antenna.

FIG. 16 shows a circuit arrangement 1600 with a booster antenna circuit 1601 and a chip module antenna circuit 1602. The chip module antenna circuit 1602 includes a voltage-limiting element arranged to shorten a part of the chip module antenna.

The booster antenna 1601 corresponds to the booster antenna circuit 201 and the chip module antenna circuit 1602 corresponds to the chip module antenna circuit 202.

In contrast to the chip module antenna circuit 202, the inductor modeling the chip module antenna inductance is separated into a first inductor 1603 and a second inductor 1604 connected between the first inductor 1603 and the resistor 1605 (corresponding to the resistor 204) and a voltage-limiting element 1606 is connected in parallel to the second inductor 1604 and the resistor 1605.

Figure 17:
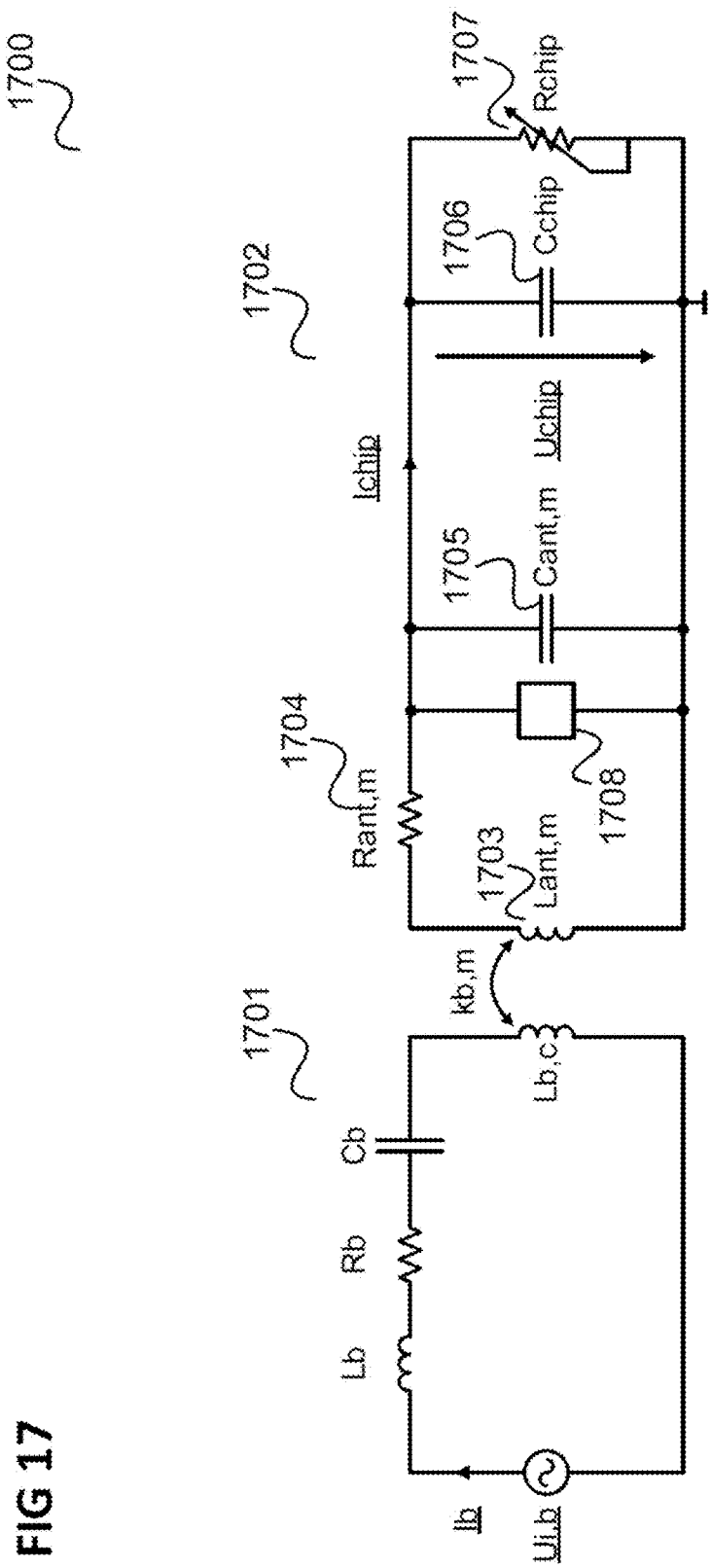
FIG. 17 shows a circuit arrangement with a booster antenna circuit and a chip module antenna circuit, wherein the chip module antenna circuit includes a voltage-limiting element arranged to shorten the chip module antenna.

FIG. 17 shows a circuit arrangement 1700 with a booster antenna circuit 1701 and a chip module antenna circuit 1702. The chip module antenna circuit 1702 includes a voltage-limiting element arranged to shorten the chip module antenna.

The booster antenna 1701 corresponds to the booster antenna circuit 201 and the chip module antenna circuit 1702 corresponds to the chip module antenna circuit 202. Accordingly, the chip module antenna circuit 202 includes an inductor 1703, resistors 1704, 1707 and capacitors 1705, 1706.

In contrast to the chip module antenna circuit 202, the chip module antenna circuit 1702 includes a voltage-limiting element 1708 arranged in parallel to the inductor 1704 and the resistor 1705.

c) Utilizing Saturation and Temperature Dependency of Ferrites for the Control Element.

Figure 18:
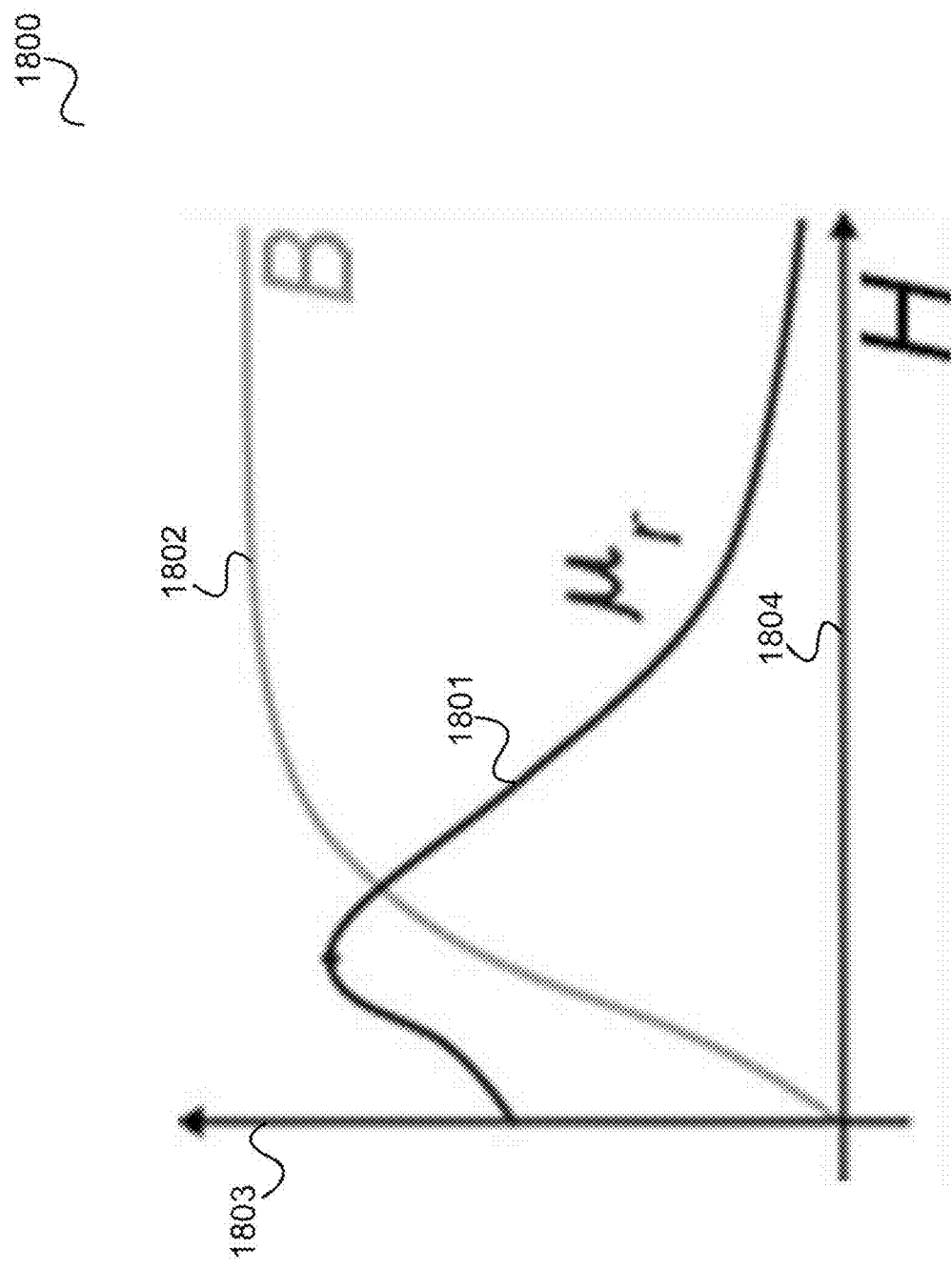
FIG. 18 shows a diagram showing the behavior of a ferrite.

FIG. 18 shows a diagram 1800 showing the behavior of a ferrite.

As shown by a first graph 1801 a ferrite's permeability, $\mu_r$ (increasing from bottom to top along a vertical axis 1803), has a non-linear dependency subject to the magnetic field strength H to which it is exposed (increasing from left to right along a horizontal axis 1804).

As shown by a second graph 1802, at higher magnetic field strength, the magnetic flux density B (increasing from bottom to top along the vertical axis 1803) saturates. This effect equals a change in permeability. Since the inductance, L, of a booster antenna including a ferrite (e.g. a ferrite core) is proportional to the permeability, this means that at high magnetic field strengths the inductance value and thus the resonance frequency of the booster antenna circuit change. In case that the resonance frequency change results in a shift away from the energy transmission frequency (e.g. of a reader), less energy is picked up by the booster antenna. As the induced voltage and the geometrical inductance value remain unchanged, adding a ferrite increases the flux density by a factor equal to its relative permeability according to the following formulas:

$B = \mu_r \mu_0 H$ $H = N*I$ (wherein $N$ is the number of antenna windings and $I$ is the antenna current)

$L \sim N^2 \mu_r \mu_0$

A ferrite's magnetization happens according to a hysteresis curve, reflecting its material characteristics. Thus, the ferrite's permeability is changed subject to its hysteresis curve, if it is exposed to an altering magnetic field. Certainly, the inductance of an antenna coil having a ferrite core is changed accordingly.

Figure 19:
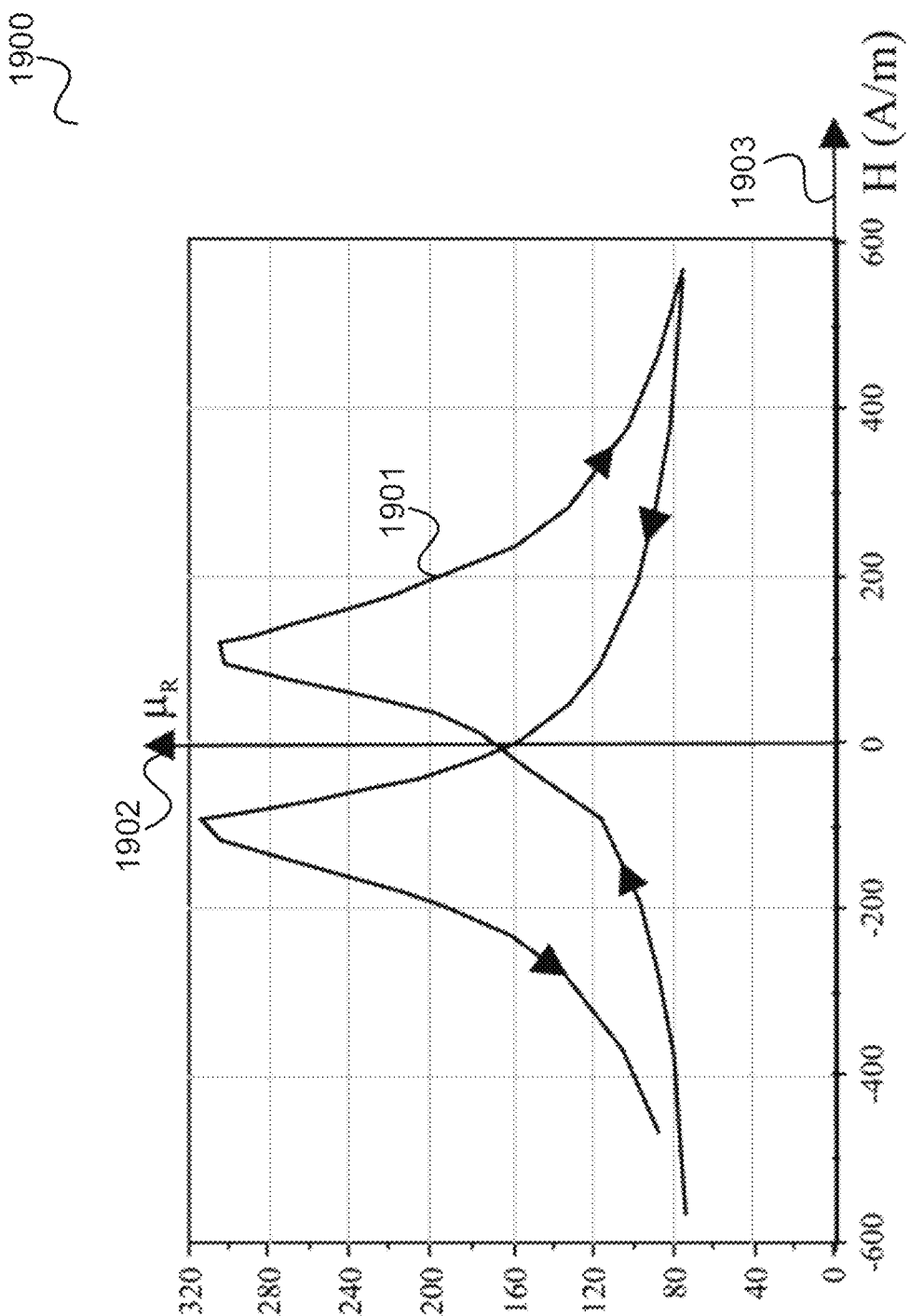
FIG. 19 shows a diagram with a graph illustrating the hysteresis according to which the permeability of a ferrite changes with the magnetic field strength.

FIG. 19 shows a diagram 1900 with a graph 1901 illustrating the hysteresis according to which the permeability (increasing form bottom to top along the vertical axis 1902) changes with the magnetic field strength (increasing form left to right along the horizontal axis 1903).

Additionally, ferrites' characteristics also depend on their temperature. Consequently, this change may be utilized by using the chip's self-heating for heating up a ferrite element (similarly as described with reference to FIG. 9 and FIG. 10).

Figure 20:
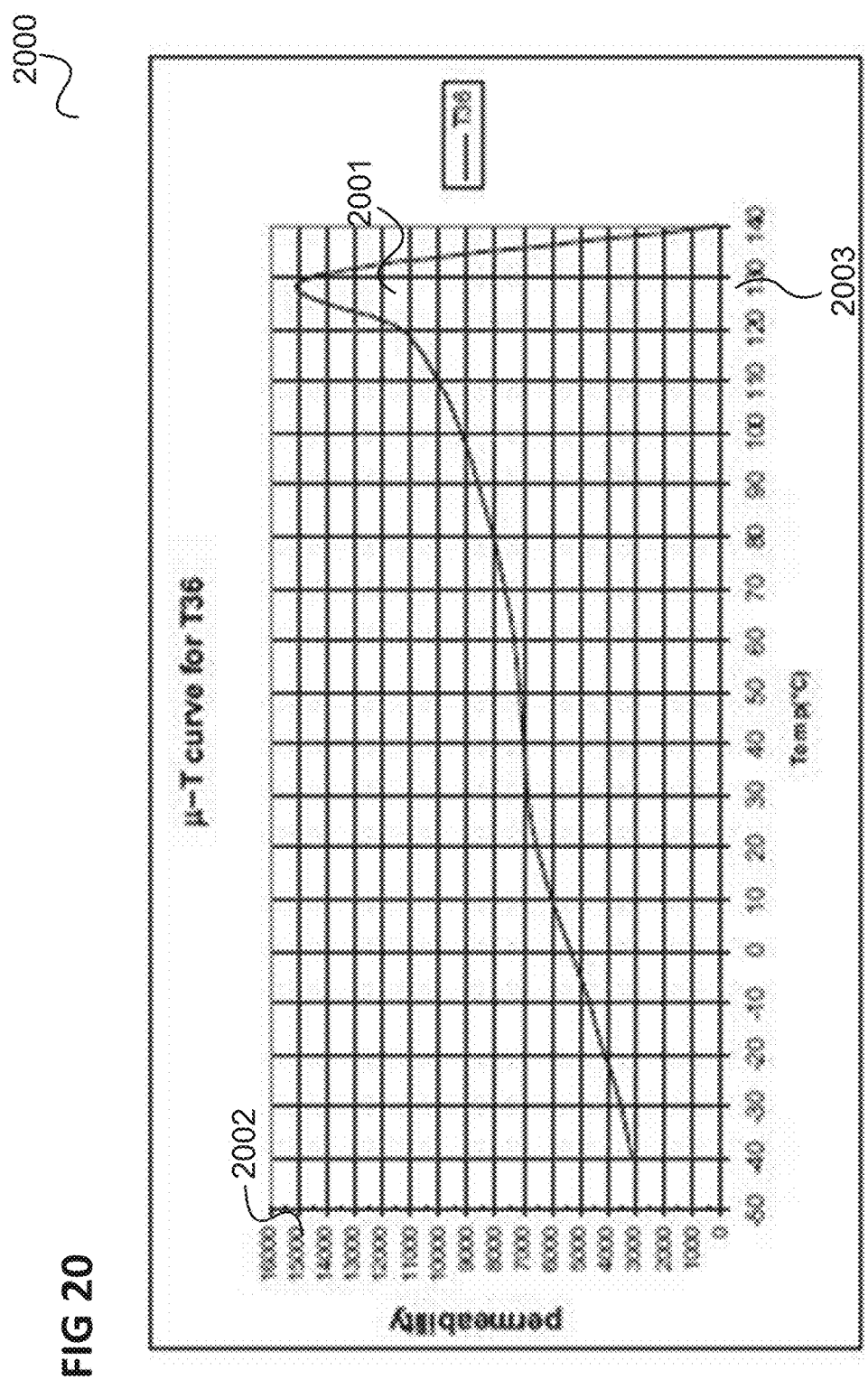
FIG. 20 shows a diagram with a graph illustrating the behavior of the permeability of a ferrite in dependence of its temperature.

FIG. 20 shows a diagram 2000 with a graph 2001 illustrating the behavior of the permeability (increasing form bottom to top along the vertical axis 2002) of a ferrite in dependence of its temperature (increasing form left to right along the horizontal axis 2003).

The fact that ferrites' characteristics depend on temperature and on the magnetic field can be utilized for detuning the booster antenna. For example, an appropriate ferrite can be placed in the booster antenna's coupling coil (i.e. i.e. the coil of the coupling antenna) or in the coil of a dedicated so-called sense antenna integrated in the booster antenna circuit. As soon as the ferrite's relative permeability gets changed due to saturation or temperature, the inductance of the coupling antenna $L_{b,c}$ or of the sense antenna $L_{Sense}$ changes, respectively and thus the resonance frequency of the respective antenna shifts and less energy is picked up and/or transferred to the inductively coupled chip module antenna.

Figure 21:
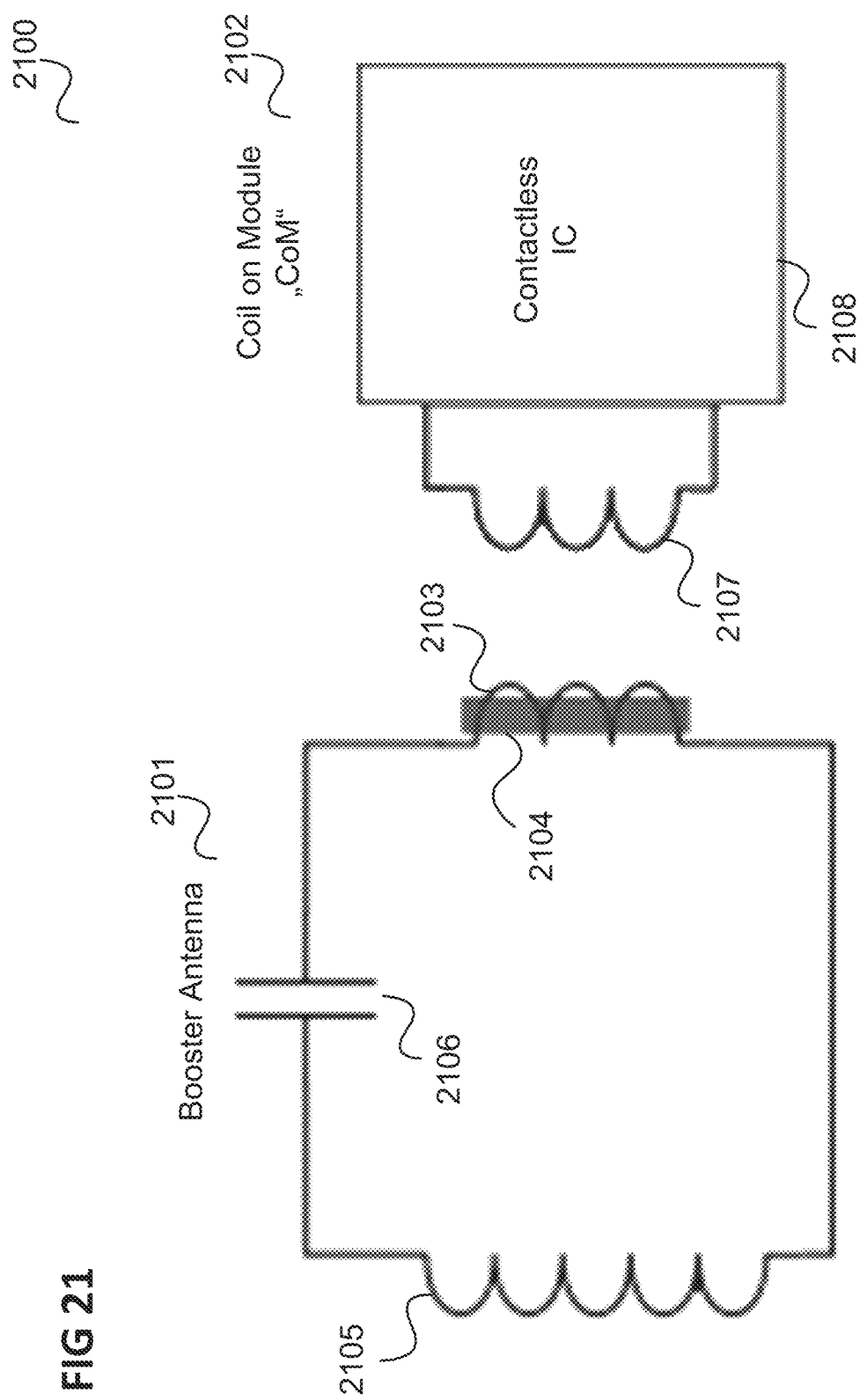
FIG. 21 shows a circuit arrangement with a booster antenna circuit and a chip module antenna circuit in which the booster antenna circuit includes a coupling antenna with a ferrite core.

FIG. 21 shows a circuit arrangement 2100 with a booster antenna circuit 2101 and a chip module antenna circuit 2102 in which the booster antenna circuit 2101 includes a coupling antenna 2103 with a ferrite core 2104 for coupling the booster antenna circuit 2101 and the chip module antenna circuit 2102.

The booster antenna circuit 2101 further includes a booster antenna 2105 and a capacitor 2106 connected to the coupling antenna 2103 such that they form a series connection with the coupling antenna 2103.

The chip module antenna circuit 2102 is for example formed according to a Coil on Module (CoM) architecture and includes a chip module antenna 2107 connected to a chip card chip 2108.

The inductance of the booster antenna circuit 2101 is given as the sum of the inductance of the booster antenna 2105 and the inductance of the coupling antenna 2103.

Figure 22:
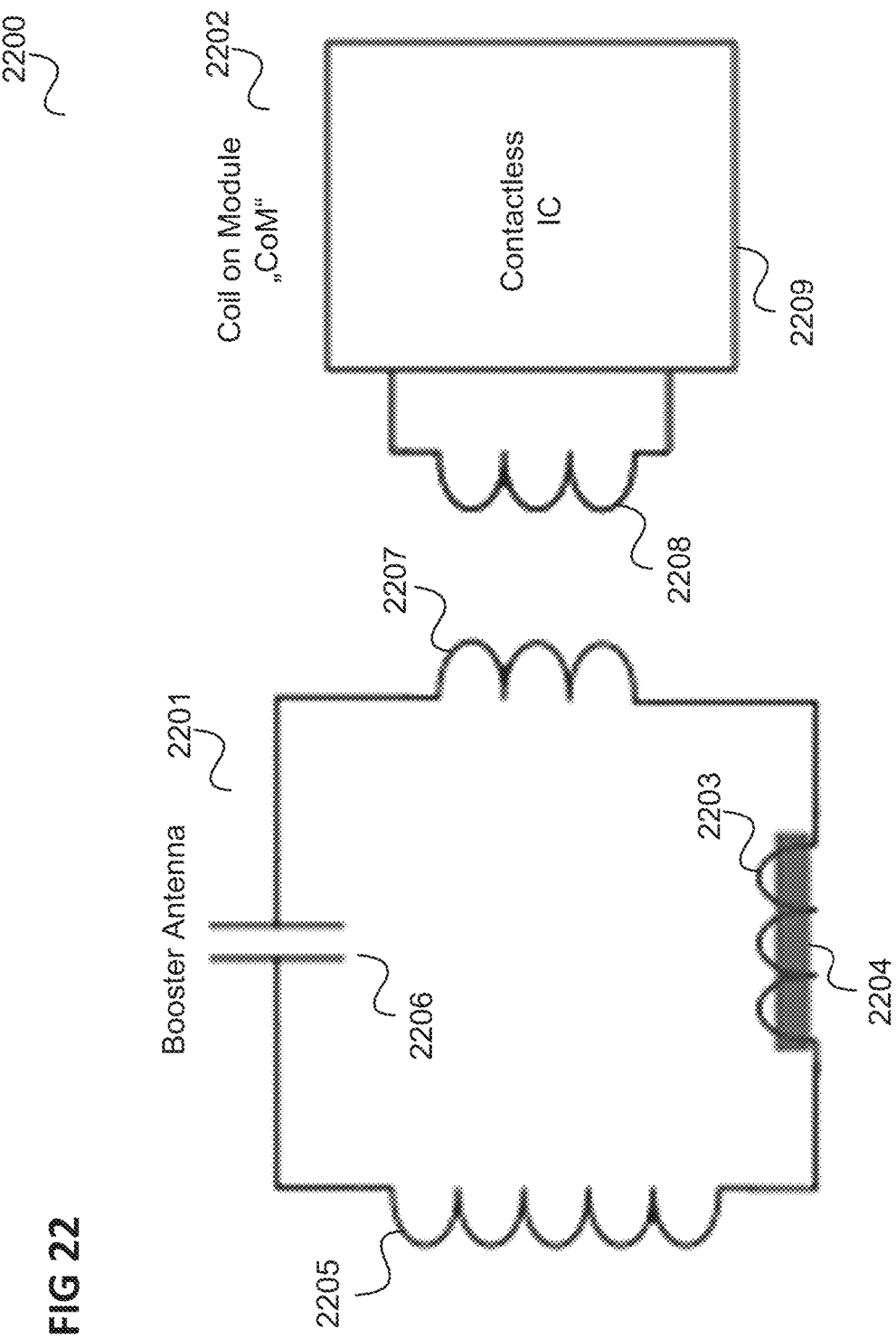
FIG. 22 shows a circuit arrangement with a booster antenna circuit and a chip module antenna circuit in which the booster antenna circuit includes a sense antenna with a ferrite core.

FIG. 22 shows a circuit arrangement 2200 with a booster antenna circuit 2201 and a chip module antenna circuit 2202 in which the booster antenna circuit 2201 includes a sense antenna 2203 with a ferrite core 2204.

The booster antenna circuit 2201 further includes a booster antenna 2205, a capacitor 2206 and a coupling antenna 2207 connected to the sense antenna 2203 such that they form a series connection with the sense antenna 2203.

The chip module antenna circuit 2202 is for example formed according to a Coil on Module (CoM) architecture and includes a chip module antenna 2208 connected to a chip card chip 2209.

The inductance of the booster antenna circuit 2201 is given as the sum of the inductance of the booster antenna 2205, the inductance of the coupling antenna 2207 and the inductance of the sense antenna 2203.

Figure 23:
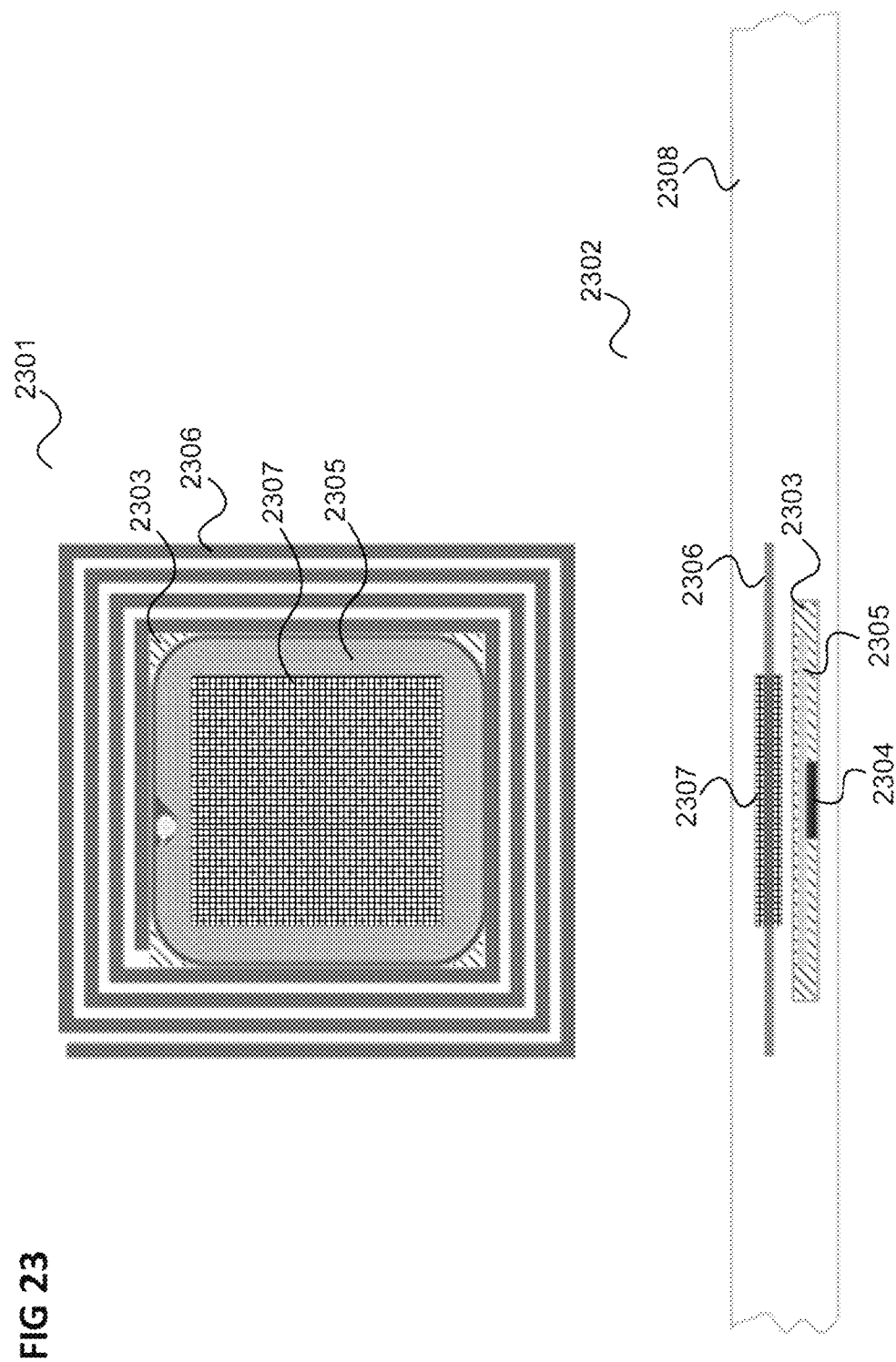
FIG. 23 shows a top view and a cross section of a chip module according to a CoM architecture.

FIG. 23 shows a top view 2301 and a cross section 2302 of a chip module 2303 according to a CoM architecture with a chip 2304 and a chip module antenna 2305.

A coupling coil 2306 is arranged around and slightly above the chip module 2303 in a chip card 2308. The coupling coil 2306 encloses a ferrite core 2307 arranged above the chip module 2303.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A chip card, comprising:
   a chip;
   an antenna;
   a coupling structure configured to provide energy from the antenna to the chip; and
   a circuit component configured to control, depending on a field strength of a magnetic field to which the chip card is exposed, at least one of a resonance frequency of the antenna, a quality factor of the antenna and an energy transmission efficiency of the coupling structure,
   wherein the circuit component is configured to shift the resonance frequency of the antenna away from a predetermined system frequency with increasing field strength of the magnetic field above a threshold of the field strength of the magnetic field.

2. The chip card of claim 1,
   wherein the antenna is galvanically coupled to the chip by the coupling structure.

3. The chip card of claim 1,
   wherein the circuit component is configured to reduce the quality factor of the antenna with increasing field strength of the magnetic field above a threshold of the field strength of the magnetic field.

4. The chip card of claim 1,
   wherein the antenna is a booster antenna;
   wherein the chip card comprises a chip module antenna circuit comprising the chip and a chip module antenna;
   wherein the chip card comprises a booster antenna circuit comprising the booster antenna and a coupling antenna inductively coupled to the chip module antenna, wherein the booster antenna circuit forms a resonant circuit;
   wherein the coupling structure includes the chip module antenna and the coupling antenna; and
   wherein the circuit component is configured to control at least one of the resonance frequency of the booster antenna circuit, the quality factor of the booster antenna circuit and an inductive coupling between the booster antenna circuit and the chip module antenna circuit depending on the field strength of the magnetic field to which the chip card is exposed.

5. The chip card of claim 4,
wherein the circuit component is configured to control a mutual inductance of the coupling antenna and the chip module antenna depending on the field strength of the magnetic field.

6. The chip card of claim 5,
wherein the circuit component is configured to decrease the mutual inductance of the coupling antenna and the chip module antenna with increasing field strength of the magnetic field above a threshold of the field strength of the magnetic field.

7. The chip card of claim 4,
wherein the circuit component includes a voltage limiting element arranged to shorten at least a part of the coupling antenna or the chip module antenna.

8. The chip card of claim 4,
wherein the circuit component includes a ferrite core of the coupling antenna.

9. The chip card of claim 4,
wherein the booster antenna circuit further comprises a sense antenna and the circuit component includes a ferrite core of the sense antenna.

10. The chip card of claim 1,
wherein the circuit component includes a variable resistor.

11. The chip card of claim 10,
wherein the variable resistor is a resistor whose resistance depends on a field strength of a magnetic field to which it is exposed.

12. The chip card of claim 11,
wherein the variable resistor comprises a structure having a giant magnetoresistance effect associated therewith.

13. The chip card of claim 10,
wherein the variable resistor is disposed in physical contact with the chip so as to be heated by the chip.

14. The chip card of claim 1,
wherein the circuit component includes a voltage limiting element.

15. The chip card of claim 14,
wherein the voltage limiting element is an element with a non-linear voltage-dependent resistance.

16. The chip card of claim 14,
wherein the voltage limiting element comprises a diode or a varistor.

17. A chip card, comprising:
a chip;
an antenna;
a coupling structure configured to provide energy from the antenna to the chip; and
a circuit component configured to control, depending on a field strength of a magnetic field to which the chip card is exposed, a quality factor of the antenna,
wherein the circuit component is configured to reduce the quality factor of the antenna with increasing field strength of the magnetic field above a threshold of the field strength of the magnetic field.

18. A chip card, comprising:
a chip module antenna circuit including
a chip, and
a chip module antenna;
a booster antenna circuit including
a booster antenna, and
a coupling antenna inductively coupled to the chip module antenna;
a coupling structure configured to provide energy from the booster antenna to the chip, the coupling structure including
the chip module antenna, and
the coupling antenna; and
a circuit component configured to control, depending on a field strength of a magnetic field to which the chip card is exposed, a mutual inductance of the coupling antenna and the chip module antenna depending on the field strength of the magnetic field.

19. The chip card of claim 18,
wherein the circuit component is configured to decrease the mutual inductance of the coupling antenna and the chip module antenna with increasing field strength of the magnetic field above a threshold of the field strength of the magnetic field.

20. A chip card, comprising:
a chip;
an antenna;
a coupling structure configured to provide energy from the antenna to the chip; and
a circuit component configured to control, depending on a field strength of a magnetic field to which the chip card is exposed, at least one of a resonance frequency of the antenna, a quality factor of the antenna and an energy transmission efficiency of the coupling structure,
wherein the circuit component includes a variable resistor whose resistance depends on the field strength of the magnetic field to which it is exposed, the variable resistor comprising a structure having a giant magnetoresistance effect associated therewith.

* * * * *